United States Patent
Palanki et al.

(10) Patent No.: US 8,942,165 B2
(45) Date of Patent: Jan. 27, 2015

(54) SYSTEM AND METHOD FOR DISTRIBUTED MULTIPLE-INPUT MULTIPLE-OUTPUT (MIMO) IN A WIRELESS COMMUNICATION SYSTEM

(75) Inventors: Ravi Palanki, San Diego, CA (US); Parag A. Agashe, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 12/505,126

(22) Filed: Jul. 17, 2009

(65) Prior Publication Data

US 2010/0027471 A1 Feb. 4, 2010

Related U.S. Application Data

(60) Provisional application No. 61/085,762, filed on Aug. 1, 2008.

(51) Int. Cl.
*H04W 36/00* (2009.01)
*H04W 36/22* (2009.01)
(Continued)

(52) U.S. Cl.
CPC ........... *H04B 7/024* (2013.01); *H04W 72/0406* (2013.01); *H04B 7/0413* (2013.01);
(Continued)

(58) Field of Classification Search
USPC .......... 370/328, 331, 332–333, 338; 455/436, 455/437–439, 442–443
See application file for complete search history.

(56) References Cited

U.S. PATENT DOCUMENTS 7,697,485 B2 * 4/2010 Liu et al. ........................ 370/334
7,764,957 B2 * 7/2010 Stern-Berkowitz et al. ........................ 455/422.1
(Continued)

FOREIGN PATENT DOCUMENTS

CN 101053276 A 10/2007
EP 1560452 A2 8/2005
(Continued)

OTHER PUBLICATIONS

Alcatel Shanghai Bell et al: Collaborative MIMO for LTE-A downlink 3GPP Draft; R1-082501-DL Collaborative MIMO, 3rd Generation Partnership.
(Continued)

*Primary Examiner* — Candal Elpenord

(57) ABSTRACT

Systems and methodologies are described herein that facilitate distributed multiple-input multiple-output (MIMO) or cooperative multipoint (CoMP) communication in a wireless communication system. As described herein, multiple cells, such as a serving cell and an auxiliary cell, can cooperate to conduct communication with one or more associated terminals. In one example described herein, an associated core network can exchange data and/or control signaling with a single cell communicating with a given terminal, which can then tunnel respective data and/or control signaling to other cell(s). By doing so, CoMP communication can be made transparent to the core network and can be achieved without requiring changes to the network. As further described herein, a terminal can exchange Physical Downlink Control Channel (PDCCH) assignments and/or other information exclusively with the serving cell in addition to or in place of other information exchanged with a serving cell and/or an auxiliary cell.

34 Claims, 18 Drawing Sheets

(51) Int. Cl.
*H04W 4/00* (2009.01)
*H04W 92/20* (2009.01)
*H04B 7/04* (2006.01)
*H04B 7/06* (2006.01)
*H04B 7/02* (2006.01)
*H04W 72/04* (2009.01)
*H04W 36/20* (2009.01)

(52) U.S. Cl.
CPC ............ *H04B 7/0408* (2013.01); *H04B 7/0617* (2013.01); *H04W 36/0005* (2013.01); *H04W 36/20* (2013.01)
USPC ............. 370/328; 370/338; 370/331; 455/68; 455/436

(56) References Cited

U.S. PATENT DOCUMENTS

| | | | |
|---|---|---|---|
| 8,050,222 B2* | 11/2011 | Maeda et al. | 370/329 |
| 8,064,386 B2* | 11/2011 | Pan et al. | 370/328 |
| 8,072,918 B2* | 12/2011 | Muharemovic et al. | 370/319 |
| 8,116,675 B2* | 2/2012 | Lee et al. | 455/13.3 |
| 2002/0141360 A1* | 10/2002 | Baba et al. | 370/331 |
| 2004/0152491 A1* | 8/2004 | Lobinger et al. | 455/561 |
| 2005/0094600 A1* | 5/2005 | Zhang et al. | 370/331 |
| 2006/0079234 A1 | 4/2006 | Ishikawa | |
| 2006/0084436 A1 | 4/2006 | Green et al. | |
| 2006/0120477 A1 | 6/2006 | Shen et al. | |
| 2006/0182063 A1* | 8/2006 | Ma et al. | 370/331 |
| 2006/0293056 A1* | 12/2006 | Kim et al. | 455/442 |
| 2007/0047495 A1* | 3/2007 | Ji et al. | 370/335 |
| 2007/0254667 A1* | 11/2007 | Jokinen | 455/436 |
| 2008/0176566 A1 | 7/2008 | Akita | |
| 2008/0267131 A1* | 10/2008 | Kangude et al. | 370/331 |
| 2008/0268844 A1* | 10/2008 | Ma et al. | 455/436 |
| 2009/0061878 A1* | 3/2009 | Fischer | 455/436 |

FOREIGN PATENT DOCUMENTS

| | | |
|---|---|---|
| EP | 1608197 A1 | 12/2005 |
| EP | 1720372 A1 | 11/2006 |
| EP | 1740008 A1 | 1/2007 |
| EP | 1758421 A1 | 2/2007 |
| JP | 2006115119 A | 4/2006 |
| JP | 2007502557 A | 2/2007 |
| JP | 2008505560 A | 2/2008 |
| JP | 2008103865 A | 5/2008 |
| KR | 20070000320 A | 1/2007 |
| RU | 2006130594 A | 2/2008 |
| RU | 2006145869 A | 6/2008 |
| WO | WO-2005018255 A1 | 2/2005 |
| WO | 2006005028 A1 | 1/2006 |
| WO | 2006073227 A1 | 7/2006 |
| WO | WO-2009087808 A1 | 7/2009 |
| WO | WO-2010049970 A1 | 5/2010 |

OTHER PUBLICATIONS

Project (3GPP), Mobile Competence Centre ; 650, Route DES Lucioles ; F-06921—Sophia-Antipolis Cedex ; France, vol. RAN WG1, No. Warsaw, Poland; 20080624, XP050110769 [retrieved on Jun. 24, 2008] paragraph [0001]—paragraph [0002].
Balachandran K., et al., "Inter-Base Station Coordination for Interference Management" IEEE 802.16 Broadband Wireless Access Working Group, No. IEEEC80216m-08/393, May 12, 2008, XP002559608 paragraph [0002]; figures 1, 2.
Ericsson: "A discussion on some technology components for LTE-Advanced" 3GPP Meeting, TSG-RAN WG1#53, Kansas City, MO, USA, No. R1-082024, May 5, 2008,-pp. 1-11, XP002541666 paragraph [0001] paragraph C02.31-paragraph C02.41.
International Search Report and Written Opinion—PCT/US2009/052516—ISA/EPO—Jan. 5, 2010.
Motorola: "LTE Advanced technical proposals" 3GPP IMT-Advanced Workshop, No. REV-080011, Apr. 2008 (2008-041, XP002559610 p. 7-p. 14.
Texas Instruments: "Network MIMO Precoding" 3GPP TSG RAN WG1, No. R1-082497, Jul. 4, 2008, XP002559609.
Yang Song et al: "Collaborative MIMO, IEEE C802. 16m-07/244r1" Internet Citation, [Online] Nov. 7, 2007, pp. 1-9, XP002547035 Retrieved from the Internet: URL:http://www.wirelessman.org/tgm/contrib/> [retrieved on Sep. 23, 2009] p. 2-p. 4; figure 1.
Taiwan Search Report—TW098125921—TIPO—Nov. 20, 2013.
NTT DoCoMo: "Views on Coordinated Multipoint Transmission/Reception in LTE-Advanced", 3GPP TSG RAN WG1 Meeting #54bis R1-083686, 3GPP, Oct. 3, 2008, 13 pages.

* cited by examiner

SYSTEM AND METHOD FOR DISTRIBUTED MULTIPLE-INPUT MULTIPLE-OUTPUT (MIMO) IN A WIRELESS COMMUNICATION SYSTEM

CROSS-REFERENCE

This application claims the benefit of U.S. Provisional Application Ser. No. 61/085,762, filed Aug. 1, 2008, and entitled "NETWORK ARCHITECTURE FOR DISTRIBUTED MULTIPLE-INPUT MULTIPLE-OUTPUT WIRELESS COMMUNICATION," the entirety of which is incorporated herein by reference.

BACKGROUND

I. Field

The present disclosure relates generally to wireless communications, and more specifically to techniques for cooperative transmission in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In a MIMO communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases.

One example of a MIMO communication system is a Distributed MIMO (D-MIMO) or Cooperative Multipoint (CoMP) system, in which a plurality of cells can cooperate to exchange information with one or more receiving devices, such as user equipment units (UEs) or the like. By way of example, respective cells associated with the same Node B or different Node Bs in a CoMP system can cooperate by utilizing joint processing and/or similar techniques, in which multiple packets can be transmitted from multiple cells. However, in this and/or other scenarios involving a CoMP system, it would be desirable to implement architectures and/or techniques for routing packets, control signaling, and/or other information between respective cells in order to facilitate efficient cooperation between the respective cells.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a serving network cell and an auxiliary network cell; exchanging control information with at least the serving network cell; and exchanging data in at least one transmission cooperatively conducted by the serving network cell and the auxiliary network cell.

A second aspect described herein relates to a wireless communications apparatus, which can comprise a memory that stores data relating to a serving network cell and an auxiliary network cell. The wireless communications apparatus can further comprise a processor configured to exchange control signaling with at least the serving network cell and to exchange data in at least one transmission cooperatively conducted by the serving network cell and the auxiliary network cell.

A third aspect relates to an apparatus, which can comprise means for conducting one or more control communications with a serving cell and means for conducting one or more data communications, wherein respective data communications are cooperatively performed by the serving cell and at least an auxiliary cell.

A fourth aspect described herein relates to a computer program product, which can include a computer-readable medium that comprises code for causing a computer to conduct one or more control communications with a serving cell and code for causing a computer to conduct one or more data communications, wherein respective data communications are cooperatively performed by the serving cell and at least an auxiliary cell.

A fifth aspect herein relates to a method operable in a wireless communication environment. The method can comprise exchanging control information with at least one user equipment unit (UE) and indicating the control information exchanged with the at least one UE to an auxiliary network cell.

A sixth aspect relates to a wireless communications apparatus, which can comprise a memory that stores data relating to at least one terminal and an auxiliary network cell and a processor configured to exchange control information with the at least one terminal and to indicate exchanged control information to the auxiliary network cell.

A seventh aspect described herein relates to an apparatus operable in a wireless communication system. The apparatus can comprise means for conducting one or more control communications with at least one terminal and means for indicating the one or more control communications to an auxiliary cell.

An eighth aspect relates to a computer program product, which can include a computer-readable medium that comprises code for causing a computer to conduct one or more control communications with at least one UE and code for causing a computer to indicate the one or more control communications to an auxiliary network cell.

A ninth aspect relates to a method, which can comprise the acts of exchanging control information relating to at least one UE with a serving network cell for the at least one UE and communicating according to the exchanged control information.

A tenth aspect described herein relates to a wireless communications apparatus, which can comprise a memory that stores data relating to at least one UE and a serving cell for the at least one UE. The wireless communications apparatus can further comprise a processor configured to exchange control information relating to the at least one UE with the serving cell and to communicate according to the exchanged control information.

An eleventh aspect relates to an apparatus, which can comprise means for conducting one or more communications of control information relating to at least one terminal with a serving cell for the at least one terminal and means for managing respective subsequent communications based at least in part on the one or more control communications.

A twelfth aspect described herein relates to a computer program product, which can include a computer-readable medium that comprises code for causing a computer to conduct one or more communications of control information relating to at least one UE with a serving network cell for the at least one UE and code for causing a computer to manage respective subsequent communications based at least in part on the one or more control communications.

A thirteenth aspect relates to a method, which can comprise exchanging a first set of information with at least one UE, the first set of information comprising at least one of control signaling or data; exchanging a second set of information with a core network entity, the second set of information comprising at least one of control signaling or data; and indicating at least one of the first set of information or the second set of information to an auxiliary network cell.

A fourteenth aspect described herein relates to a wireless communications apparatus, which can comprise a memory that stores data relating to at least one UE, an associated core network, and an auxiliary network cell. The wireless communications apparatus can further comprise a processor configured to exchange a first set of control signaling or data with the at least one UE, to exchange a second set of control signaling or data with the associated core network, and to indicate at least a portion of the first set of control signaling or data or the second set of control signaling or data to the auxiliary network cell.

A fifteenth aspect described herein relates to an apparatus, which can comprise means for exchanging a first set of information with at least one UE, the first set of information comprising at least one of control signaling or data; means for exchanging a second set of information with a core network entity, the second set of information comprising at least one of control signaling or data; and means for indicating at least one of the first set of information or the second set of information to an auxiliary network cell.

A sixteenth aspect herein relates to a computer program product, which can include a computer-readable medium that comprises code for causing a computer to exchange a first set of information with at least one UE, the first set of information comprising at least one of control signaling or data; code for causing a computer to exchange a second set of information with a core network, the second set of information comprising at least one of control signaling or data; and code for causing a computer to indicate at least one of the first set of information or the second set of information to an auxiliary network cell.

A seventeenth aspect described herein relates to a method operable in a wireless communication system. The method can comprise exchanging a first set of control signaling or data with at least one UE; exchanging a second set of control signaling or data with a core network entity; and communicating at least one indication of exchanged control signaling or data to a serving network cell for the at least one UE.

An eighteenth aspect herein relates to a wireless communications apparatus, which can comprise a memory that stores data relating to at least one UE, an associated core network, and a serving network cell. The wireless communications apparatus can further comprise a processor configured to exchange control signaling or data with the at least one UE, to exchange control signaling or data with the associated core network, and to indicate at least a portion of the control signaling or data exchanged with the at least one UE or the associated core network to the serving network cell.

A nineteenth aspect described herein relates to an apparatus operable in a wireless communication system. The apparatus can comprise means for exchanging a first set of control signaling or data with at least one UE; means for exchanging a second set of control signaling or data with a core network; and means for communicating at least one indication of exchanged control signaling or data to a serving network cell for the at least one UE.

A twentieth aspect relates to a computer program product, which can include a computer-readable medium that comprises code for causing a computer to exchange a first set of information with at least one UE, the first set of information comprising at least one of control signaling or data; code for causing a computer to exchange a second set of information with a core network, the second set of information comprising at least one of control signaling or data; and code for causing a computer to indicate at least a portion of the first set of information or the second set of information to a serving network cell.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
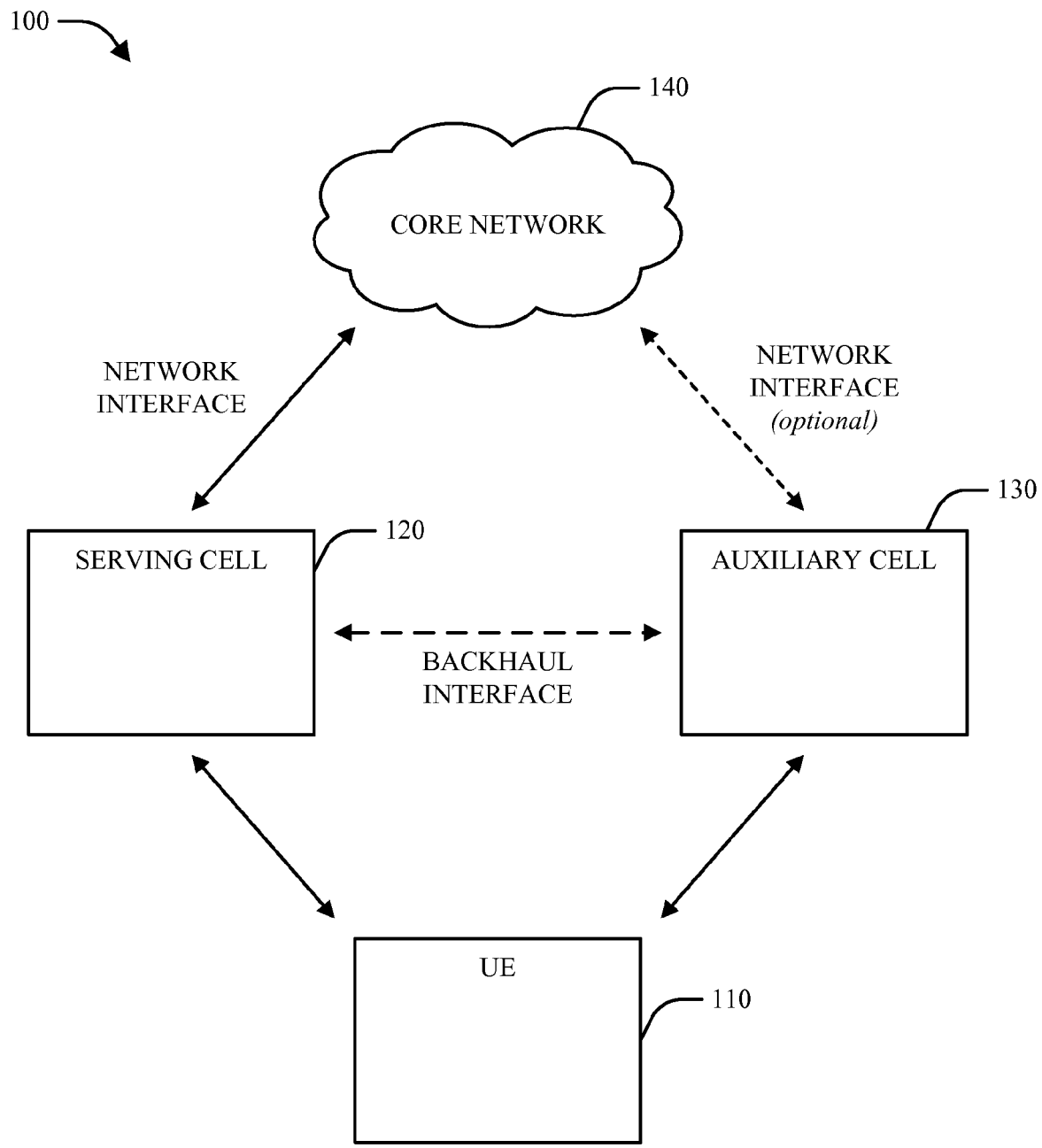
FIG. 1 is a block diagram of a system for coordinating exchanges of information between a user equipment unit and respective cells in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for coordinating exchanges of information between a UE 110 and respective cells 120-130 in a wireless communication environment in accordance with various aspects described herein.

As FIG. 1 illustrates, system 100 can include one or more user equipment units (UEs) 110, which can communicate with one or more associated network cells, such as a serving cell 120 and/or an auxiliary cell 130. While the names "serving cell" and "auxiliary cell" are used herein to refer to network cells 120-130, it should be appreciated that no functionality of cells 120-130 is intended to be implied by the naming of such cells 120-130. For example, it should be appreciated that auxiliary cell 130 can serve UE 110 by providing communication coverage for UE 110 in addition to, or in place of, serving cell 120 in some cases. It should further be appreciated that the hereto appended claims are not intended to require any functionality of cells 120-130 beyond that explicitly recited by said claims. In addition, it should be appreciated that cells 120-130 can be any of any suitable cell type(s), including, for example, macro cells, femto cells or Home Node Bs (HNBs), pico cells, relays, or the like.

In accordance with one aspect, UE 110 can conduct one or more uplink (UL, also referred to as reverse link (RL)) communications to serving cell 120 and/or auxiliary cell 130, serving cell 120 and/or auxiliary cell 130 can conduct one or more downlink (DL, also referred to as forward link (FL)) communications to UE 110 in various manners described herein. In one example, serving cell 120 and auxiliary cell 130 can be associated with a common Node B (base station, access point, Evolved Node B (eNB), etc.) or distinct Node Bs.

In another example, serving cell 120 and/or auxiliary cell 130 can in turn communicate with a core network 140, which can be utilized to facilitate the use of one or more data services at UE 110. Core network 140 can be and/or correspond to a wireless communication network operating under any suitable radio access technology or technologies and/or any other suitable network or internetwork (e.g., the Internet). Further, core network 140 can serve as a data source for downlink data to be provided to UE 110 via cells 120 and/or 130, a data sink for uplink data received from UE 110 via cells 120 and/or 130, or both in connection with one or more data services utilized by UE 110. In one example, core network 140 can include and/or implement the functionality of a signaling gateway (SGW), a mobility management entity (MME), and/or any other suitable entities for managing respective devices in system 100, serving as a source for packets destined for UE 110 and/or a sink for packets originating from UE 110, and/or performing other suitable functions.

In accordance with another aspect, system 100 can utilize MIMO communication, in which multiple sources and/or destinations (e.g., corresponding to respective antennas, entities, or the like) are utilized for transmission and/or reception of data, control signaling, and/or other information between devices in system 100. By utilizing MIMO communication, it can be appreciated that higher data rates, improved signal quality, and other such benefits can be realized over single-input and/or single-output communication systems in some cases.

In one example, system 100 can utilize MIMO in the form of Cooperative Multipoint (CoMP, also referred to as e.g. Network MIMO (N-MIMO), Distributed MIMO (D-MIMO), or Cooperative MIMO (Co-MIMO), etc.) transmission, in which multiple cells, such as a serving cell 120 and an auxiliary cell 130, can conduct respective cooperative or joint communications with one or more UEs 110. CoMP communication between UE 110 and cells 120-130 can utilize, for example, a joint processing scheme, in which a serving cell 120 and an auxiliary cell 130 cooperate to engage in transmitting downlink data to UE 110 and/or jointly receiving uplink data from UE 110. Additionally or alternatively, CoMP communication between UE 110 and cells 120-130 can utilize coordinated beamforming, in which serving cell 120 and auxiliary cell 130 can cooperate such that auxiliary cell 130 forms a spatial beam for transmission away from serving cell 120, thereby enabling serving cell 120 to communicate with UE 110 with reduced interference. Joint processing and coordinated beamforming are described in further detail infra with respect to FIG. 2 and FIG. 3, respectively.

In light of the above, it can be appreciated that CoMP transmission can leverage multiple cells 120-130, each of which can communicate based on information relating to a UE 110 and which can in some cases be associated with a common Node B or different Node Bs. Accordingly, it can further be appreciated that it would be desirable to implement one or more techniques within system 100 for routing information associated with CoMP communication with UE 110 to cells 120-130. As a first example, it can be appreciated that conventional core networks operate by routing data packets to a single cell. However, in order to leverage distributed communication between multiple cells 120-130 and UE 110, it would be desirable to implement a mechanism for routing relevant data packets to each of cells 120-130 in network environments associated with a core network 140 that does not support routing of data packets to multiple cells 120-130. As a second example, respective cells 120-130 conducting a CoMP transmission with a UE 110 can receive, generate, and/or otherwise obtain or leverage control information relating to UE 110. Thus, it would further be desirable to implement techniques for efficient passing of control information between cells 120-130 and/or between respective cells 120 and/or 130 and core network 140.

In accordance with one aspect, to support CoMP communication within system 100 and to achieve at least the ends described in the above examples, system 100 can be configured to utilize a serving cell 120 for a given UE 110 that communicates with core network 140 and UE 110 and an auxiliary cell 130 that communicates over the air (OTA) with UE 110. In one example, serving cell 120 can be configured to exchange packets with core network 140 via a network interface (e.g., a S1-U interface and/or another suitable E-UTRA Network (E-UTRAN) interface, etc.) between serving cell 120 and core network 140, which can comprise data, control signaling (e.g. Physical Downlink Control Channel (PDCCH) assignments or grants, Acknowledgement (ACK) signaling, etc.), and/or any other suitable information.

In addition to exchanging packets with core network 140, serving cell 120 can conduct communication with UE 110 and/or exchange respective packets with auxiliary cell 130 over a backhaul interface (e.g., an X2 interface and/or any other suitable interface). By utilizing a backhaul interface or link between serving cell 120 and auxiliary cell 130, it can be appreciated that packets can be transmitted from core network 140 to serving cell 120 and subsequently routed to auxiliary cell 130 via the backhaul interface, thereby allowing auxiliary cell 130 to be transparent to core network 140 and enabling serving cell 120 and auxiliary cell 130 to engage in CoMP communication with UE 110 without requiring implementation changes to core network 140.

Additionally or alternatively, system 100 can also be configured to utilize a network interface between auxiliary cell 130 and core network 140 in order to allow auxiliary cell 130 to exchange at least a portion of data, control signaling, and/or other information associated with UE 110 to core network 140 directly. In an example in which a network interface is provided between auxiliary cell 130 and core network 140, various portions of data, control signaling, and/or other information can be independently designated to be exchanged between serving cell 120 and core network 140 only, between auxiliary cell 130 and core network 140 only, or between core network 140 and both serving cell 120 and auxiliary cell 130. As an example, system 100 can be configured such that all downlink control information relating to UE 110 and/or a portion thereof (e.g. PDCCH assignment information relating to an assigned or granted bandwidth, coding rate, and/or other parameters for UE 110) is exclusively provided to serving cell 120 by core network 140. As another example, uplink control information received at auxiliary cell 130 from UE 110, such as grants, ACKs, or the like, can either be provided directly to core network 140 by auxiliary cell 130 or tunneled to serving cell 120 for subsequent transfer to core network 140.

Figure 2:
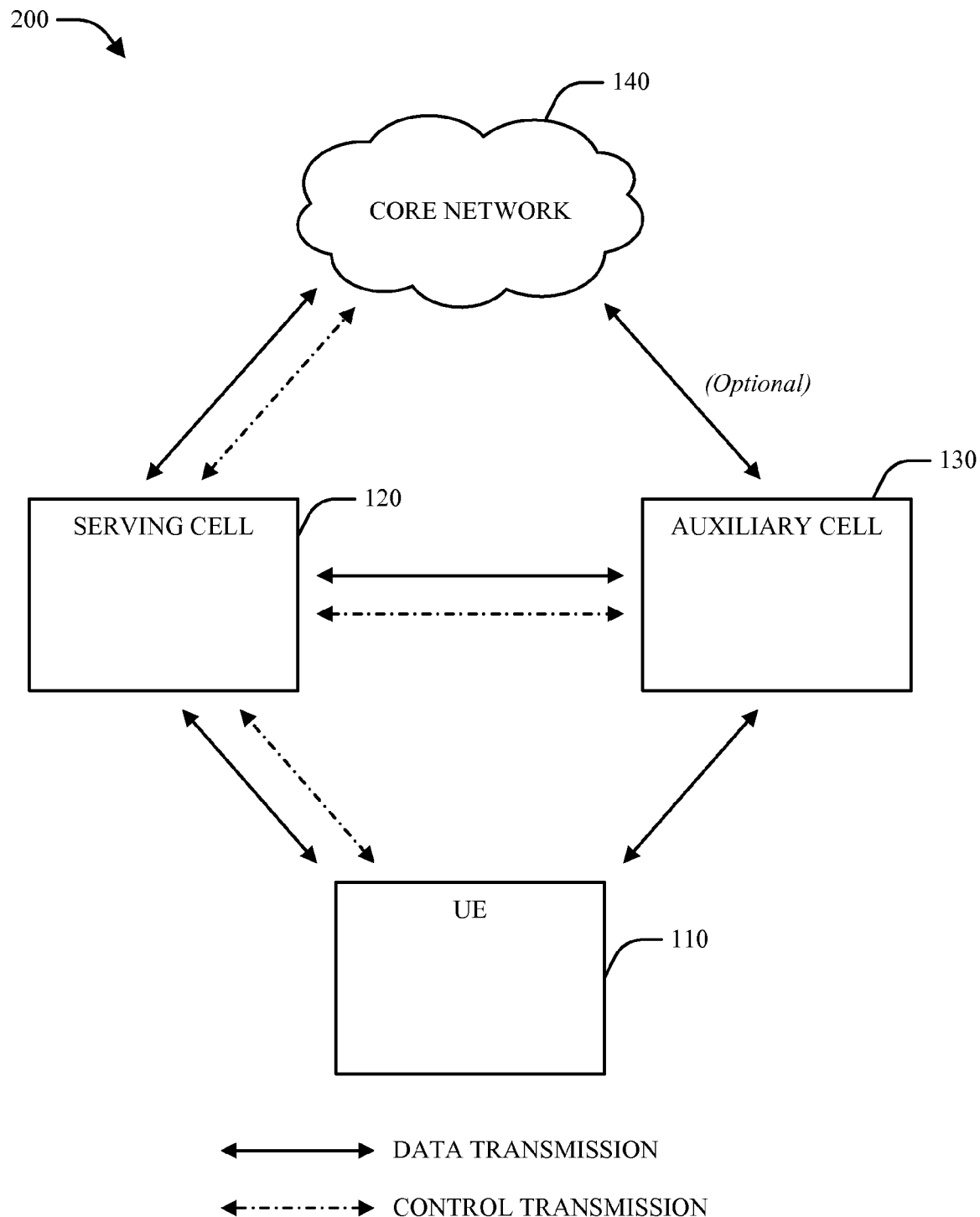
FIG. 2 is a block diagram of a system that facilitates jointly processed transmission in a wireless communication system in accordance with various aspects.

As described above, system 100 as illustrated in FIG. 1 can engage in CoMP communication in a variety of manners. By way of a first specific example, system 200 in FIG. 2 illustrates operation of UE 110, serving cell 120, auxiliary cell 130, and core network 140 during an example communication session performed using joint processing. As used herein, joint processing refers to a communication scheme in which respective cells cooperate to perform at least one cooperative or joint transmission of information to one or more receivers (e.g. UE 110). For example, instead of a first cell transmitting a modulation symbol x to a first UE and a second cell transmitting a modulation symbol y to a second UE, the cells can cooperate such that the first cell transmits ax+by to one or both of the UEs and the second cell transmits cx+dy to the same UE(s), where a, b, c, and d are coefficients chosen to optimize the signal-to-noise ratio (SNR) of the users, system capacity, and/or any other suitable metric(s).

Further, respective cells can transmit information to one or more UEs simultaneously (e.g., via joint transmission) and/or individually based on a predetermined schedule (e.g., via dynamic cell selection). In either case and/or in the case of any other joint processing technique(s), it can be appreciated that UEs receiving information based on joint processing can in some cases observe a higher SNR than that achievable through single-point transmission as a result of receiving the information from multiple sources.

In accordance with one aspect, data and/or control information can be transmitted between entities in system 200 as illustrated in FIG. 2, where solid lines represent data flows and dot-dash lines represent control flows. As system 200 illustrates, data and control information can be transferred between core network 140 and serving cell 120 and/or routed between serving cell 120 and auxiliary cell 130 via a backhaul link, thereby allowing auxiliary cell 130 to be transparent to core network 140 and enabling joint processing to be conducted without required changes to the implementation of core network 140 and/or any components associated with core network 140.

Alternatively, as further illustrated by system 200, data packets can optionally be routed between core network 140 and both serving cell 120 and auxiliary cell 130. It can be appreciated that, by refraining from transferring data packets over a backhaul interface between serving cell 120 and auxiliary cell 130, the load on the backhaul interface can be reduced. It can further be appreciated that reducing the load on the backhaul interface between serving cell 120 and auxiliary cell 130 can be beneficial in the case of a star network and/or similar network implementations, wherein the backhaul interface is implemented via transferring information back through core network 140 or another central routing station, and/or in other appropriate cases.

Further, in the event that data is provided to both serving cell 120 and auxiliary cell 130, at least a portion of control plane information can be routed from core network 140 and/or UE 110 only to serving cell 120, which can then pass on relevant control information to auxiliary cell 130. Control information received by source cell 120 can be, for example, requests to transmit a given packet on a given slot, PDCCH assignments or grants, and/or any other type(s) of control information. Accordingly, by designating a single cell for the communication of control signaling in this manner, operations such as scheduling, error handling, and the like can be performed by a single cell without requiring communication between respective cells, thereby increasing the efficiency of system 200 and/or cells within system 200.

As an alternate example to that shown in system 200, core network 140 can exchange a first portion of control information with serving cell 120 and a second overlapping or non-overlapping portion of control information with auxiliary cell 130. Thus, for example, PDCCH assignments can be exclusively transferred between core network 140 and serving cell 120 while other control information, such as ACKs or the like, can be transferred between core network and either serving cell 120 or auxiliary cell 130. Similarly, while system 200 illustrates a single control interface from serving cell 120 to UE 110, auxiliary cell 130 can additionally exchange control information with UE 110 in some cases. More particularly, in some cases auxiliary cell 130 can either send and receive control information (e.g., grants, ACKs, etc.) over the air directly to UE 110 or have the control information tunneled to UE 110 via serving cell 120. For example, grants indicating the beam direction picked by auxiliary cell 130 can be signaled by auxiliary cell 130 to UE 110. In another example, ACK information received from UE 110 can be decoded by auxiliary cell 130 and passed to serving cell 120, which can utilize the decoded ACK information to schedule subsequent transmissions.

Figure 3:
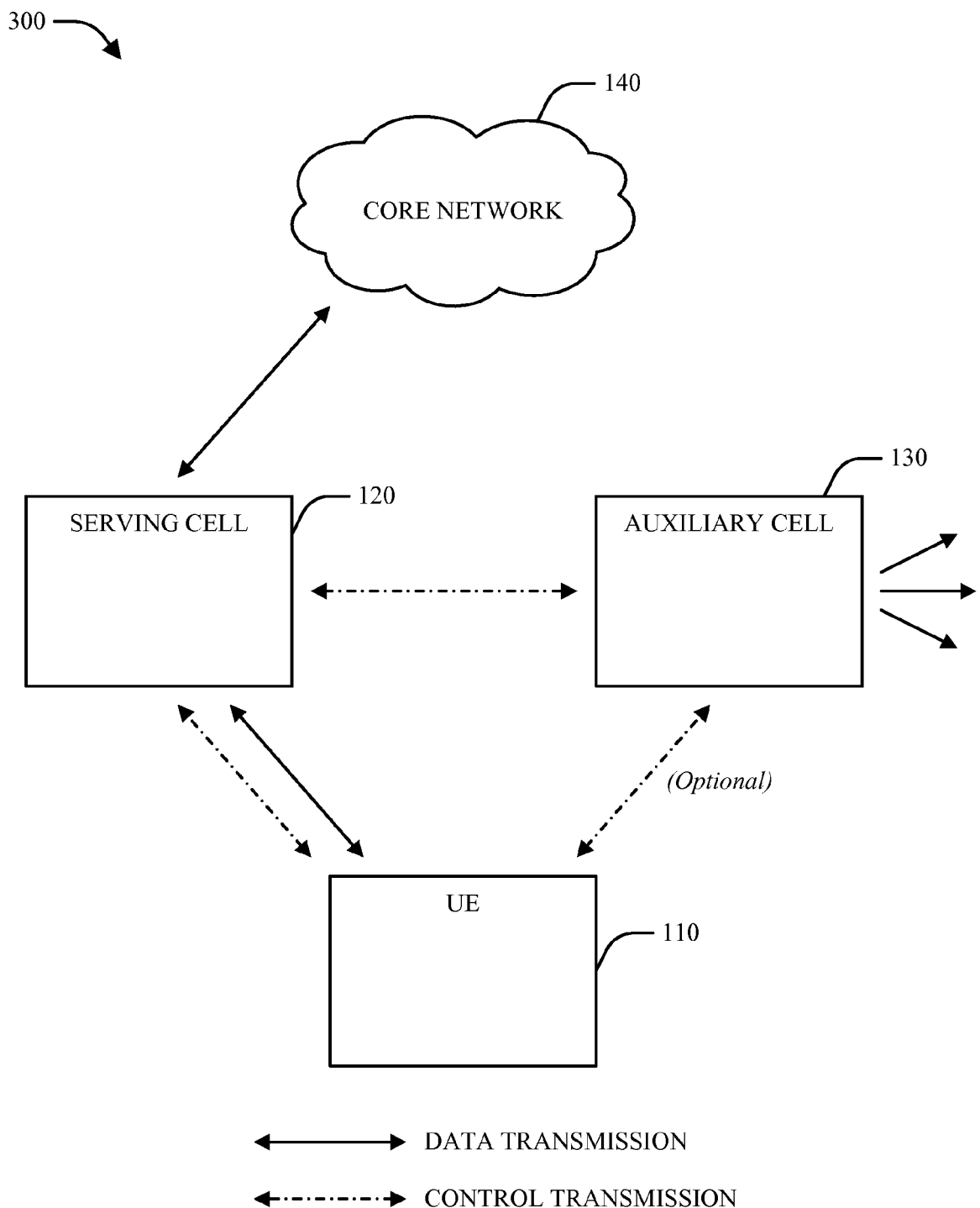
FIG. 3 is a block diagram of a system that facilitates cooperative beamforming in a wireless communication system in accordance with various aspects.

As another example of CoMP communication between UE 110, cells 120-130, and core network 140, system 300 in FIG. 3 illustrates an example communication session conducted using coordinated beamforming (CBF). As FIG. 3 illustrates, serving cell 120 and auxiliary cell 130 can cooperate to conduct CBF with respect to communication between serving cell 120 and UE 110. For example, UE 110 and/or core network 140 can exchange respective data with serving cell 120 in connection with a communication session. Further, based on control information relating to UE 110 and/or serving cell 120, such as channel quality information, interference reports provided by UE 110, information relating to the location of UE 110 and/or serving cell 120, or the like, auxiliary cell 130 can be configured to form a spatial beam away from serving cell 120 and/or UE 110, thereby reducing interference and improving observed SNR at UE 110 and/or serving cell 120.

In one example, control information relating to UE 110 can be stored at serving cell 120 and/or provided to serving cell 120 by UE 110. Additionally or alternatively, control information relating to UE 110 can be provided to auxiliary cell 130 via a backhaul link with serving cell 120 and/or optionally provided over the air by UE 110.

Figure 4:
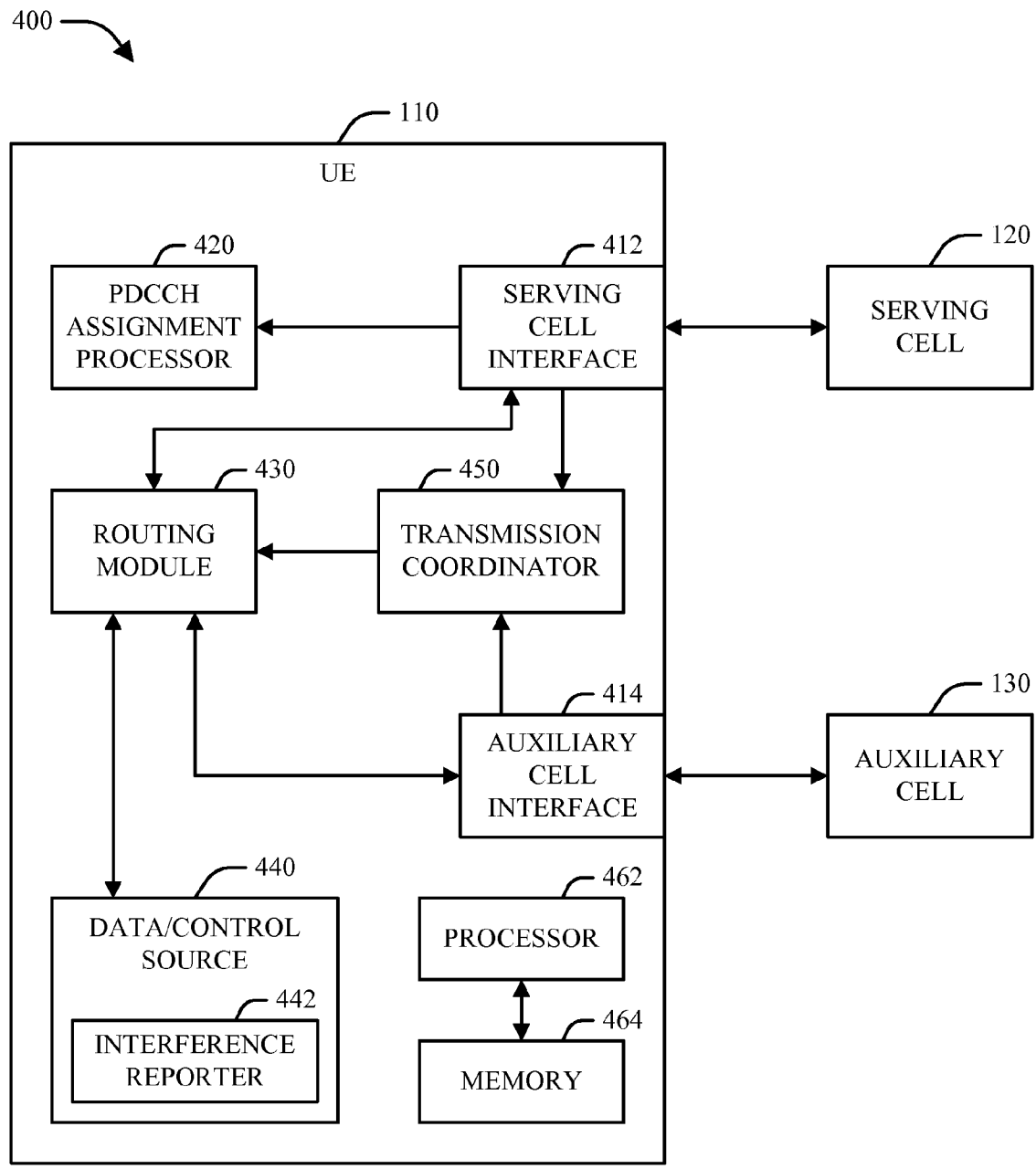
FIGS. 4-6 are block diagrams of respective systems that facilitate cooperative multipoint transmission in a wireless communication system.
Figure 5:
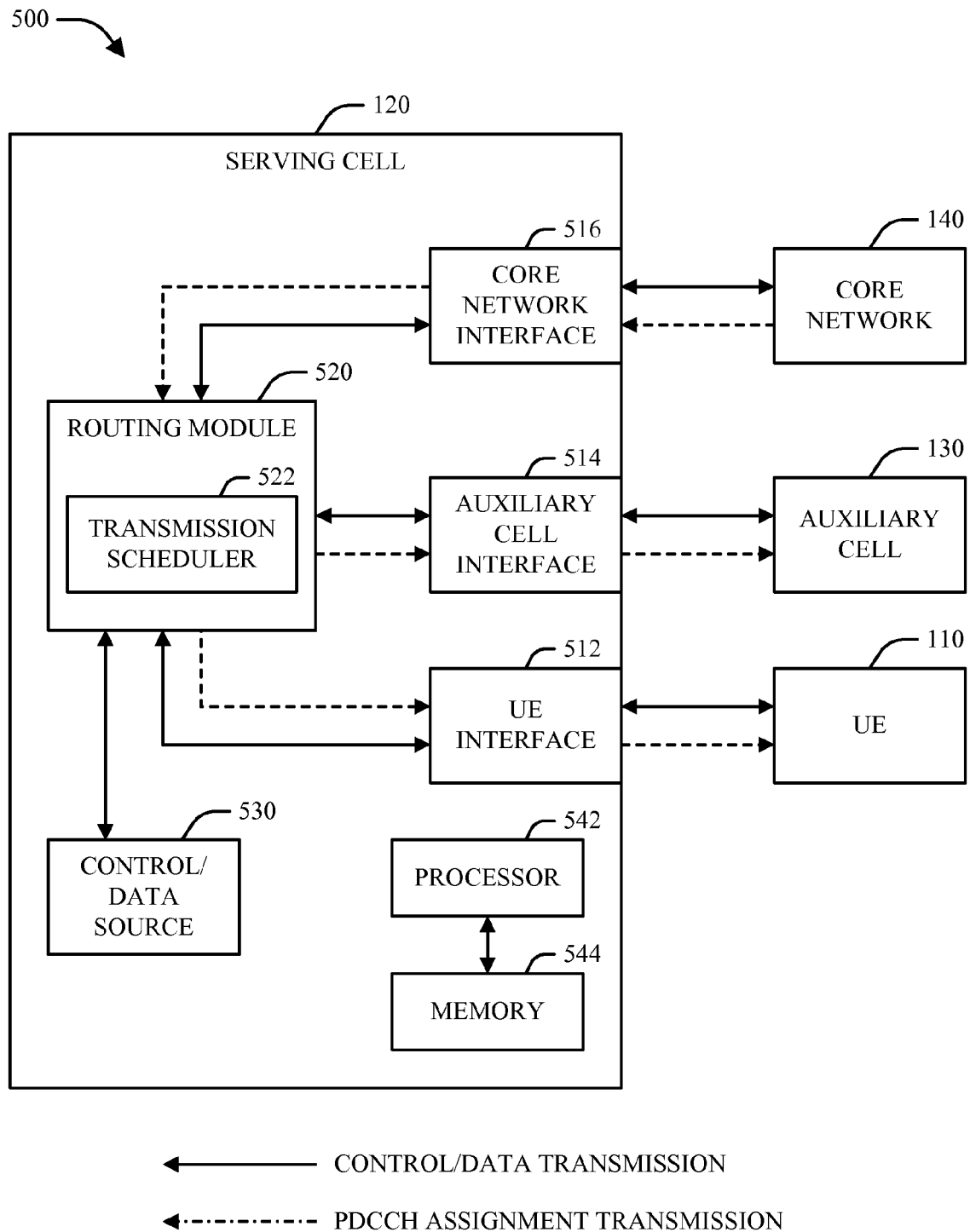
Figure 6:
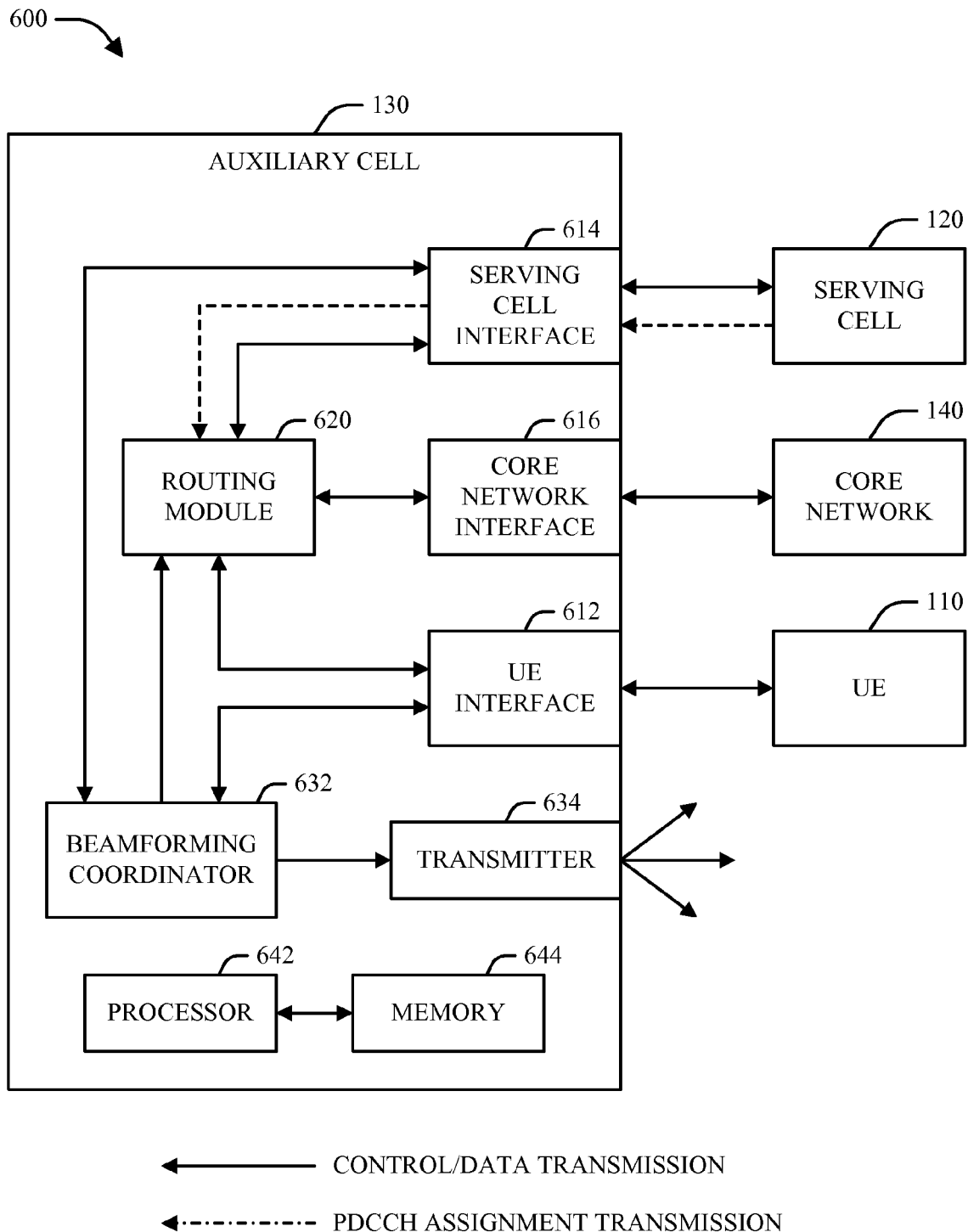

Turning now to FIGS. 4-6, respective systems 400-600 are provided that illustrate various examples of manners in which UE 110, serving cell 120, and auxiliary cell 130 can operate. It should be appreciated, however, that FIGS. 4-6 and their related description are provided by way of example and not limitation and that any suitable device implementation(s) could be utilized in connection with the techniques described herein.

With reference to FIG. 4, a first example system 400 for conducting CoMP communication can include a UE 110, which can communicate with a serving cell 120 via a serving cell interface 412 and/or an auxiliary cell 130 via an auxiliary cell interface 414. In accordance with one aspect, UE 110 can include a routing module 430, which can facilitate the exchange of control information with serving cell 120 via serving cell interface 412 and/or the exchange of data with serving cell 120 via serving cell interface 412 and/or auxiliary cell 130 via auxiliary cell interface 414.

Control information exchanged with serving cell 120 via serving cell interface 412 can include, for example, PDCCH assignment information, which can be processed at UE 110 using a PDCCH assignment processor 420. In one example, PDCCH assignment information can include beam direction information and/or any other suitable information. In another example, UE 110 can exchange information distinct from PDCCH assignment information with serving cell 120 and/or auxiliary cell 130. For example, UE 110 can be utilized to exchange data and/or control information associated with a data/control source 440 with serving cell 120 and/or auxiliary cell 130. Information associated with data/control source 440 can include, for example, ACK information, interference information (e.g., as identified by an interference reporter 442), or the like.

In one example, UE 110 can be operable to exchange data in at least one transmission cooperatively conducted by serving cell 120 and auxiliary cell 130. Thus, in a first example, UE 110 can exchange data from both serving cell 120 and auxiliary cell 130 via routing module 430 and respective interfaces 412-414 in a joint transmission between serving cell 120 and auxiliary cell 130. In one example, the joint transmission can be conducted using a set of modulation symbols to which respective beamforming weights can be applied by a transmitting entity or entities (e.g., UE 110 in the case of an uplink transmission or cells 120-130 in the case of a downlink transmission). In another example, serving cell 120 and/or auxiliary cell 130 can provide information indicative of respective beamforming weights applied to modulation symbols to be transmitted on the downlink to UE 110. Similarly, UE 110, based on information stored at data/control source 440 and/or other means, can utilize a transmission coordinator 450 and/or any other suitable component(s) to apply predetermined scheduling, beamforming weights, or the like to information to be transmitted on the uplink prior to communication with serving cell 120 and/or auxiliary cell 130.

Alternatively, in a second example of a cooperative transmission between serving cell 120 and auxiliary cell 130, UE 110 can exchange data with one of serving cell 120 or auxiliary cell 130 based on cooperative or coordinated beamforming performed between cells 120-130 as generally described with respect to FIG. 3 above. In a further example, UE 110 can include a processor 462 and/or memory 464, which can be operable to implement some or all of the functionality described above and/or any other functionality that is desired to be implemented at UE 110.

Referring next to FIG. 5, a second example system 500 for conducting CoMP communication can include a serving cell 120, which can communicate with a UE 110 via a UE interface 512, an auxiliary cell 130 via an auxiliary cell interface 514, and/or a core network 140 via a core network interface 516. In accordance with one aspect, serving cell 120 can utilize a routing module 520 and/or other suitable means to facilitate the exchange of control information with at least one UE 110 via UE interface 512. Upon exchanging control information with UE 110, serving cell 120 can further indicate the control information exchanged with UE 110 to auxiliary cell 130 via auxiliary cell interface 514. In one example as illustrated by FIG. 5, control information exchanged between serving cell 120 and UE 110 can include PDCCH assignment information, which can be received from core network 140 via core network interface 516 and/or generated locally at serving cell 120 (e.g., and/or identified by a control/data source 530). Identified PDCCH information can subsequently be provided to UE 110 and auxiliary cell 130 via respective interfaces 512-514.

In accordance with another aspect, serving cell 120 can identify data to be transmitted to a UE 110 on the downlink from core network 140 (e.g., via a S1-U interface between serving cell 120 and core network 140 and/or any other suitable communication link), control/data source 530, and/or any other suitable source(s). Upon identification of data to be transmitted to UE 110, at least a portion of the identified data can be transmitted via routing module 520 to UE 110 in a cooperative transmission with auxiliary cell 130. In one example, serving cell 120 can provide at least a portion of the identified data to auxiliary cell 130 (e.g., via an X2 interface and/or any other suitable backhaul link) such that respective data provided to auxiliary cell 130 can be transmitted to UE 110 in a joint transmission with auxiliary cell 130. Alternatively, auxiliary cell 130 can independently receive data to be communicated in a joint transmission from core network 140 and/or any other suitable source(s).

In accordance with a further aspect, serving cell 120 can be operable to receive control information from auxiliary cell 130 via an X2 interface and/or any other suitable backhaul link or interface between serving cell 120 and auxiliary cell 130. Subsequently, serving cell 120 can transmit designated data and/or control information to UE 110 using routing module 520 based on the received control information. By way of example, in the event that control information received from auxiliary cell 130 includes ACK information relating to UE 110, a transmission scheduler 522 at routing module 520 and/or another suitable component of serving cell 120 can generate a transmission schedule for the designated data and/or control information based on the received ACK information, which can then be utilized for transmitting the designated data and/or control information to UE 110. In another example, serving cell 120 can be operable to receive data, control signaling, and/or other information from UE 110. Upon receiving such information from UE 110, serving cell 120 can relay and/or otherwise communicate said information to auxiliary cell 130, core network 140, and/or any other suitable network entity. As additionally illustrated by system 500, serving cell 120 can include a processor 542 and/or memory 544, which can be operable to implement some or all of the functionality described above and/or any other functionality that is desired to be implemented at serving cell 120.

Turning to FIG. 6, a third example system 600 for conducting CoMP communication can include an auxiliary cell 130, which can communicate with at least one UE 110 via a UE interface 612, a serving cell 120 via a serving cell interface 614, and/or a core network 140 via a core network interface 616. In accordance with one aspect, auxiliary cell 130 can utilize a routing module 620 and/or other suitable means to facilitate the exchange of control information relating to at least one UE 110 with serving cell 120 via serving cell interface 614. Upon exchanging control information with serving cell 120, auxiliary cell 130 can communicate with one or more entities in system 600 (e.g., UE 110, serving cell 120, core network 140, etc.) based on the exchanged control information. In one example, control information exchanged with serving cell 120 can include PDCCH information received from serving cell 120. Additionally or alternatively, auxiliary cell 130 can be operable to exchange control information distinct from PDCCH assignment information with UE 110 and/or any other entity in system 600.

In accordance with another aspect, auxiliary cell 130 can cooperate with serving cell 120 in connection with one or more transmissions between UE 110 and serving cell 120 and/or auxiliary cell 130. In one example, auxiliary cell 130 can identify data to be transmitted to UE 110 on the downlink and transmit at least a portion of the identified data to UE 110 using routing module 620 according to exchanged control information. Data transmitted by auxiliary cell 130 can be obtained by any suitable means. For example, at least a portion of data to be transmitted to UE 110 on the downlink can be received from serving cell 120 via an X2 interface and/or any other suitable backhaul link or interface between serving cell 120 and auxiliary cell 130, received from core network 140 via a S1-U interface and/or any other suitable E-UTRAN or other interface between auxiliary cell 130 and core network 140, and/or obtained by any other suitable means. In another example, upon obtaining data to be transmitted to UE 110, auxiliary cell 130 can transmit respective data to UE in a cooperative or joint transmission with serving cell 120. Further, on the uplink, auxiliary cell 130 can receive data from at least one UE 110, which can be communicated by the at least one UE 110 exclusively to auxiliary cell 130 and/or to auxiliary cell 130 and one or more other entities in system 600. Upon receiving data from UE(s) 110, auxiliary cell 130 can communicate or relay at least a portion of the received data to serving cell 120, core network 140, and/or any other suitable network entities.

In accordance with a further aspect, auxiliary cell 130 can generate and/or otherwise obtain control information relating to at least one UE 110. Control information identified by auxiliary cell 130 can then be tunneled to serving cell 120 via a backhaul interface to serving cell 120 (e.g., an X2 interface, etc.) and/or by any other means. In still another example, auxiliary cell 130 can exchange and/or otherwise identify control information that relates to interference observed at UE 110. Based on the identified control information, a beamforming coordinator 632 and/or another suitable mechanism at auxiliary cell 130 can perform CBF and/or other similar procedures with serving cell 120 and/or one or more other entities in system 600. Beamforming coordinator 632 can facilitate CBF by, for example, selecting respective transmission parameters to substantially minimize the interference observed at UE 110 and directing communication (e.g., via interfaces 612-616 and/or a general purpose transmitter 634) according to the selected transmission parameters. Transmission parameters selected by beamforming coordinator 632 can include, for example, transmit power parameters, beam direction parameters, or the like. As additionally illustrated by system 600, auxiliary cell 130 can include a processor 642 and/or memory 644, which can be operable to implement some or all of the functionality described above and/or any other functionality that is desired to be implemented at auxiliary cell 130.

Referring now to FIGS. 7-14, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
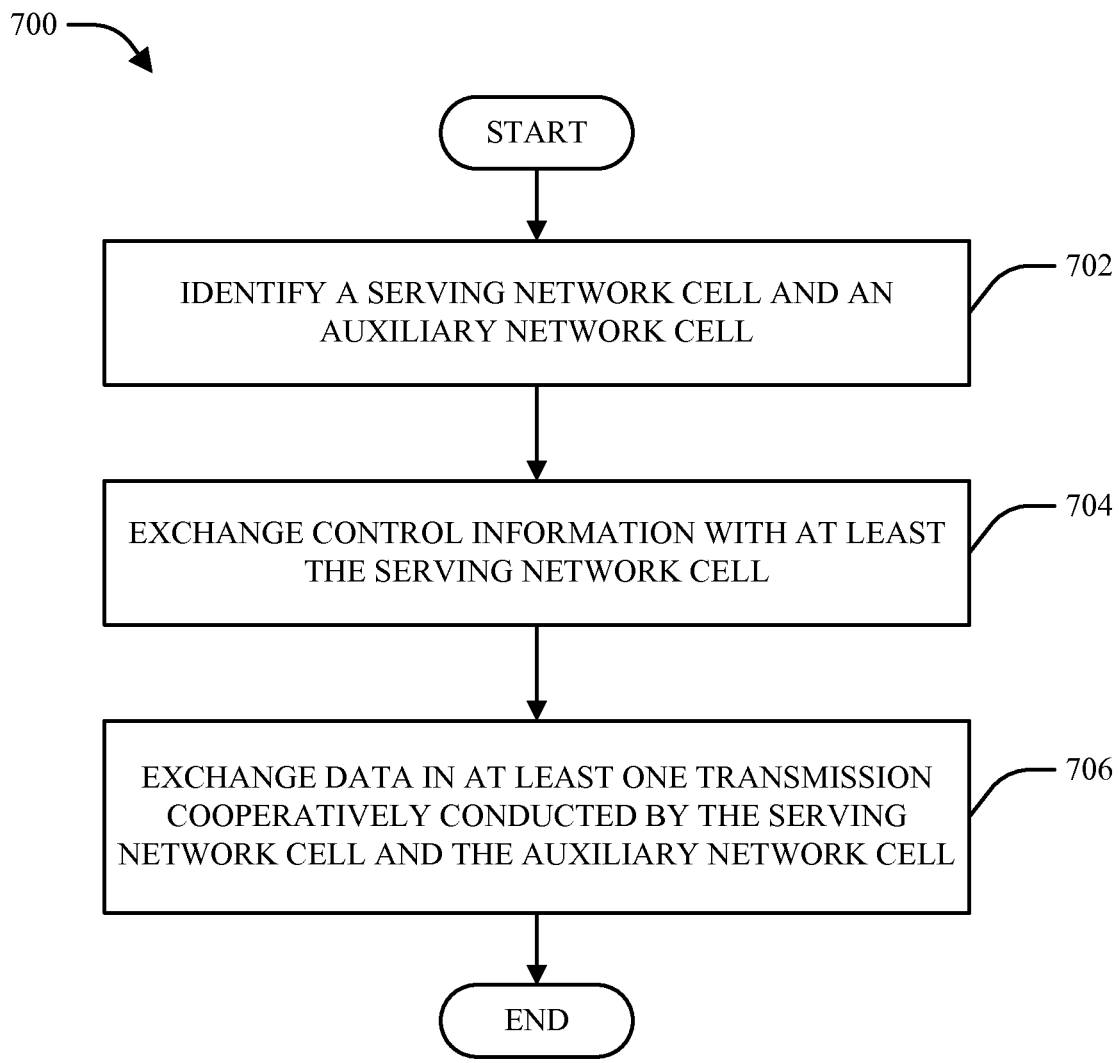
FIGS. 7-8 are flow diagrams of respective methodologies for conducting coordinated transmission with respective network cells in a wireless communication environment.

With reference to FIG. 7, illustrated is a methodology 700 for conducting coordinated transmission with respective network cells (e.g., cells 120-130) in a wireless communication environment. It is to be appreciated that methodology 700 can be performed by, for example, a terminal (e.g., UE 110) and/or any other appropriate network device. Methodology 700 begins at block 702, wherein a serving network cell (e.g., serving cell 120) and an auxiliary network cell (e.g. auxiliary cell 130) are identified. Next, at block 704, control information is exchanged with at least the serving network cell. Methodology 700 can then conclude at block 706, wherein data is exchanged in at least one transmission cooperatively conducted by the serving network cell and the auxiliary network cell.

Figure 8:
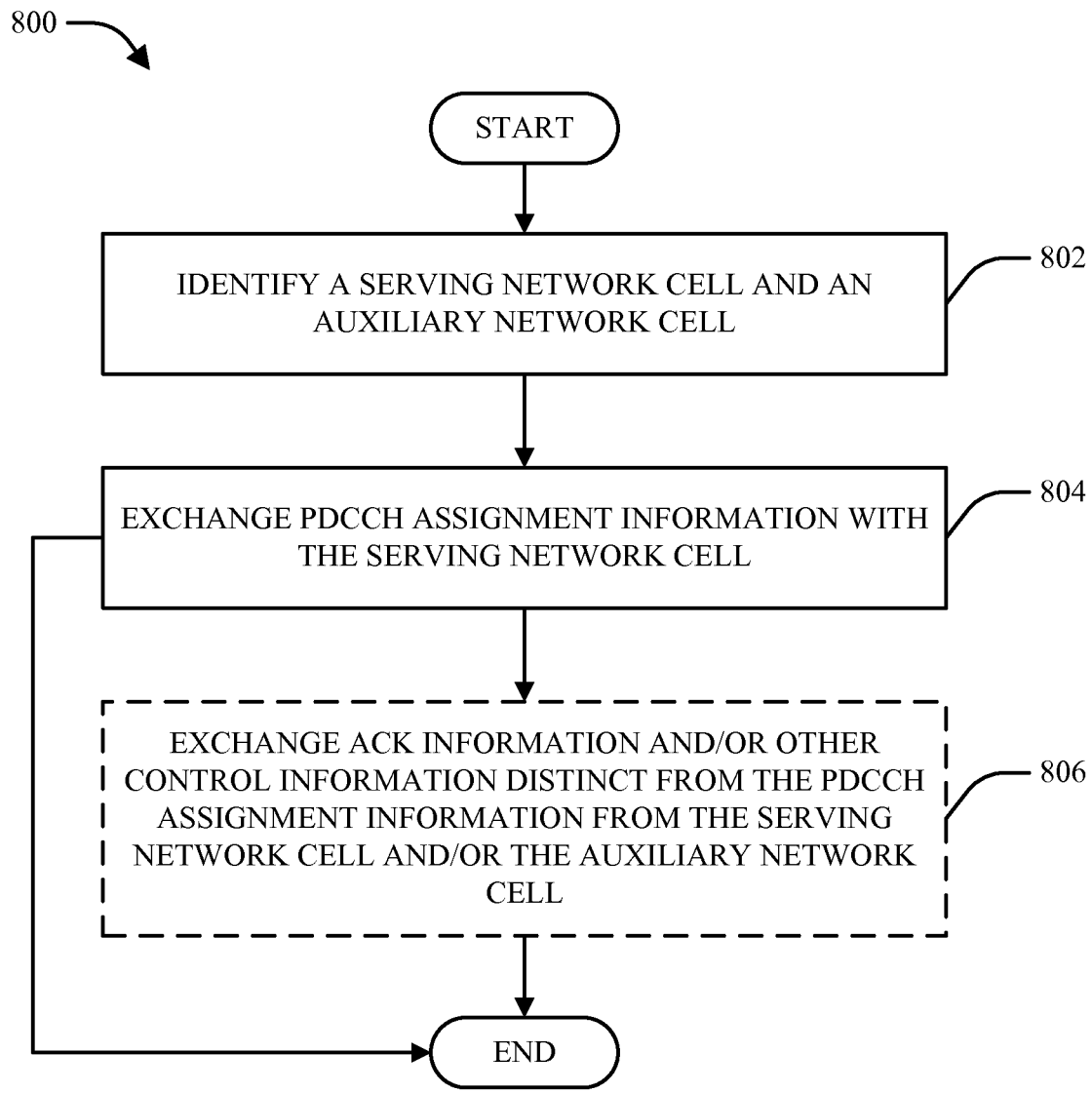

Turning now to FIG. 8, a flow diagram of another methodology 800 for conducting coordinated transmission with respective network cells in a wireless communication environment is illustrated. Methodology 800 can be performed by, for example, a UE and/or any other appropriate network entity. Methodology 800 begins at block 802, wherein a serving network cell and an auxiliary network cell are identified. Next, at block 804, PDCCH assignment information is exchanged with the serving network cell. Methodology 800 can then conclude or can optionally proceed to block 806 prior to concluding, wherein ACK information and/or other control information distinct from the PDCCH assignment information exchanged at block 804 is exchanged from the serving network cell and/or the auxiliary network cell.

Figure 9:
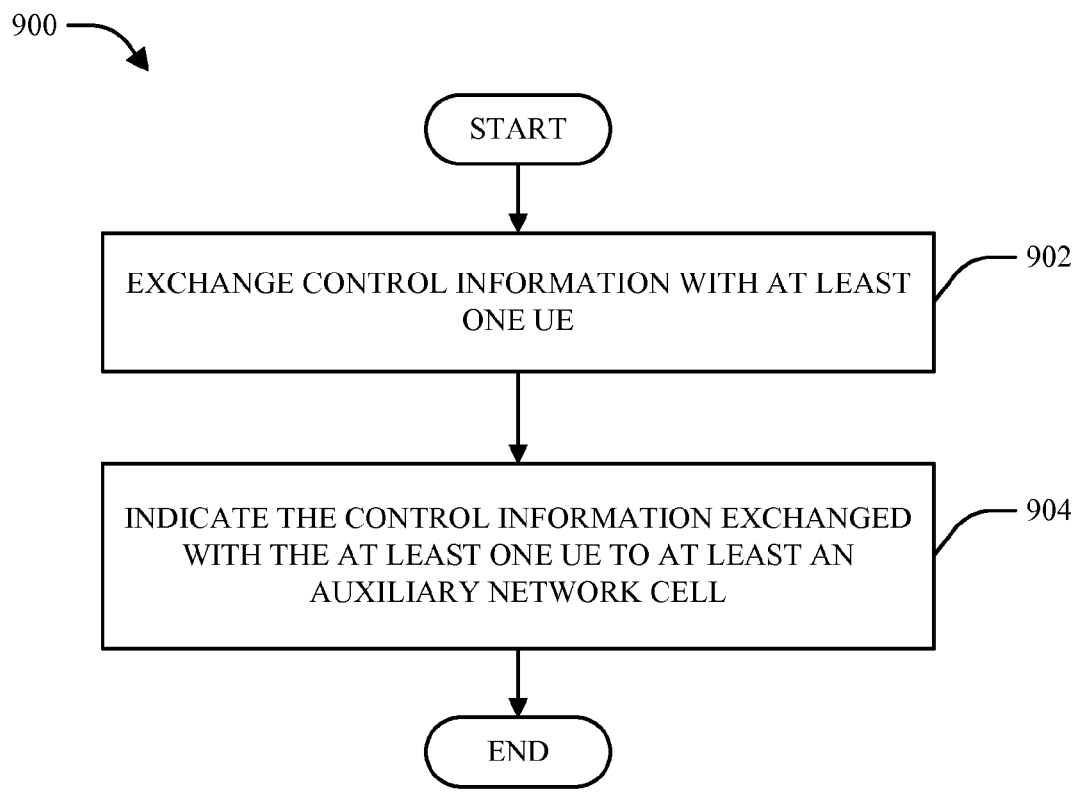
FIGS. 9-11 are flow diagrams of respective methodologies for coordinating communication with a terminal and an auxiliary network cell in a wireless communication environment.

FIG. 9 illustrates a methodology 900 for coordinating communication with a terminal (e.g., UE 110) and an auxiliary network cell (e.g., auxiliary cell 130) in a wireless communication environment. Methodology 900 can be performed by, for example, a wireless network cell (e.g., serving cell 120) and/or any other suitable network entity. Methodology 900 begins at block 902, wherein control information is exchanged with at least one UE. Methodology 900 can then conclude at block 904, wherein the control information exchanged at block 902 is indicated to at least an auxiliary network cell.

Figure 10:
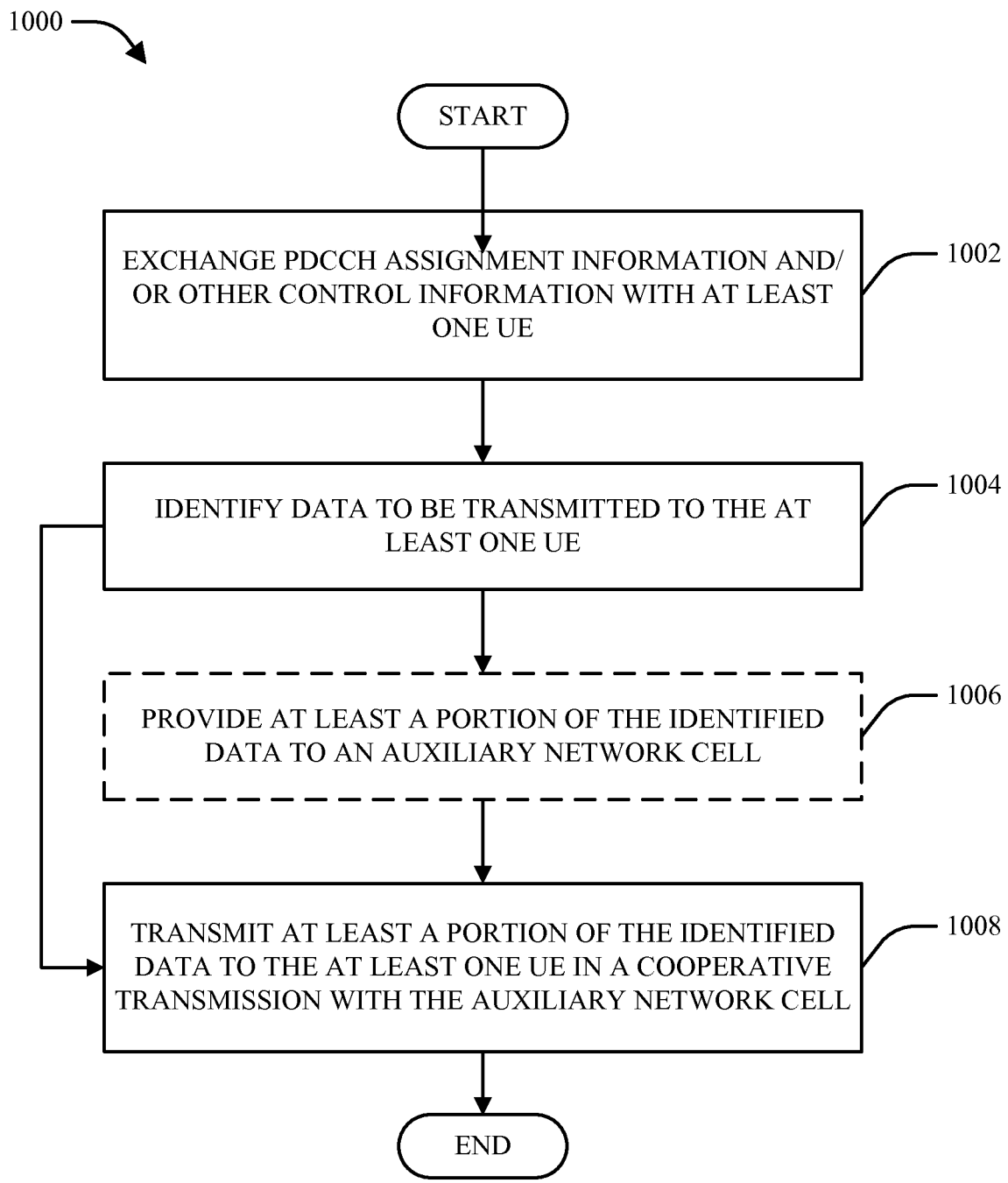

Referring to FIG. 10, illustrated is another methodology 1000 for coordinating communication with a terminal and an auxiliary network cell in a wireless communication environment. It is to be appreciated that methodology 1000 can be performed by, for example, a serving network cell and/or any other appropriate network entity. Methodology 1000 begins at block 1002, wherein PDCCH assignment information and/or other control information is exchanged with at least one UE. Next, at block 1004, data to be transmitted to the at least one UE is identified. Methodology 1000 can then optionally proceed to block 1006, wherein at least a portion of the data identified at block 1004 is provided to an auxiliary network cell. Upon completing the acts described at blocks 1004 and/or 1006, methodology 1000 can conclude at block 1008, wherein at least a portion of the data identified at block 1004 is transmitted to the at least UE in a cooperative transmission with the auxiliary network cell.

Figure 11:
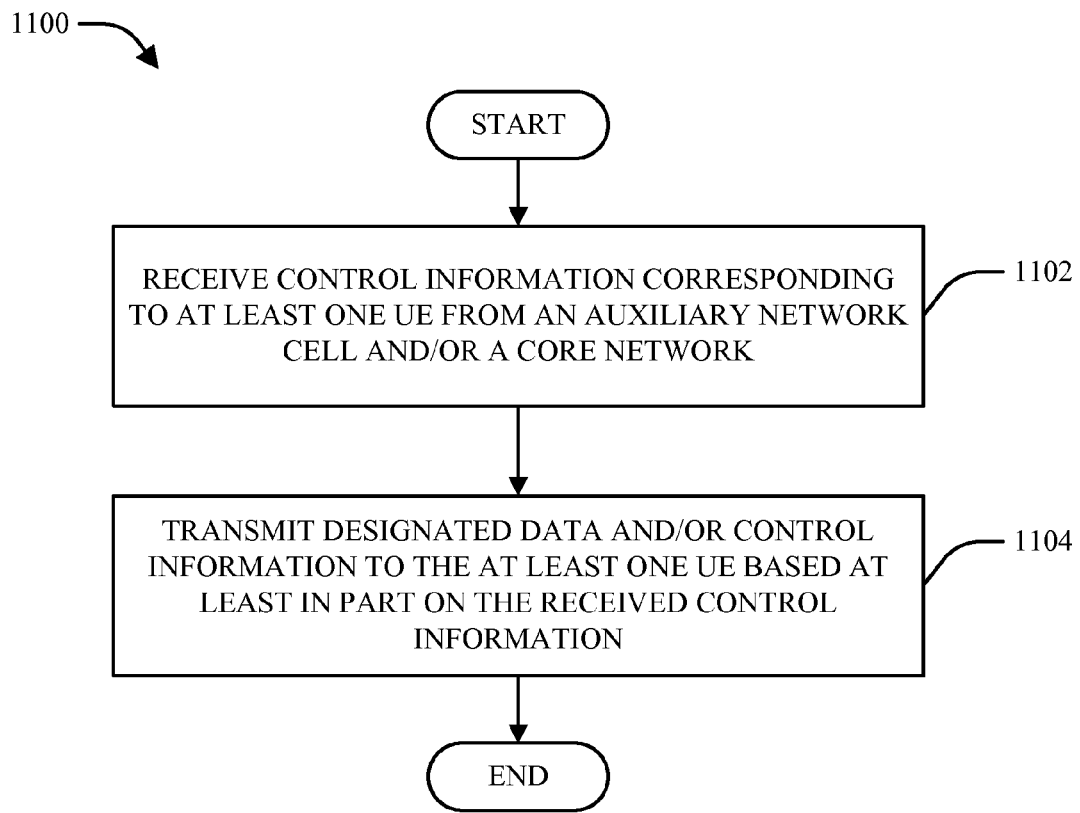

Turning next to FIG. 11, an additional methodology 1100 for coordinating communication with a terminal and an auxiliary network cell in a wireless communication environment is illustrated. Methodology 1100 can be performed by, for example, a serving network cell and/or any other appropriate network entity. Methodology 1100 begins at block 1102, wherein control information corresponding to at least one UE is received from an auxiliary network cell and/or a core network (e.g., core network 140). Methodology 1100 can then conclude at block 1104, wherein designated data and/or control information is transmitted to the at least one UE based at least in part on the control information received at block 1102.

Figure 12:
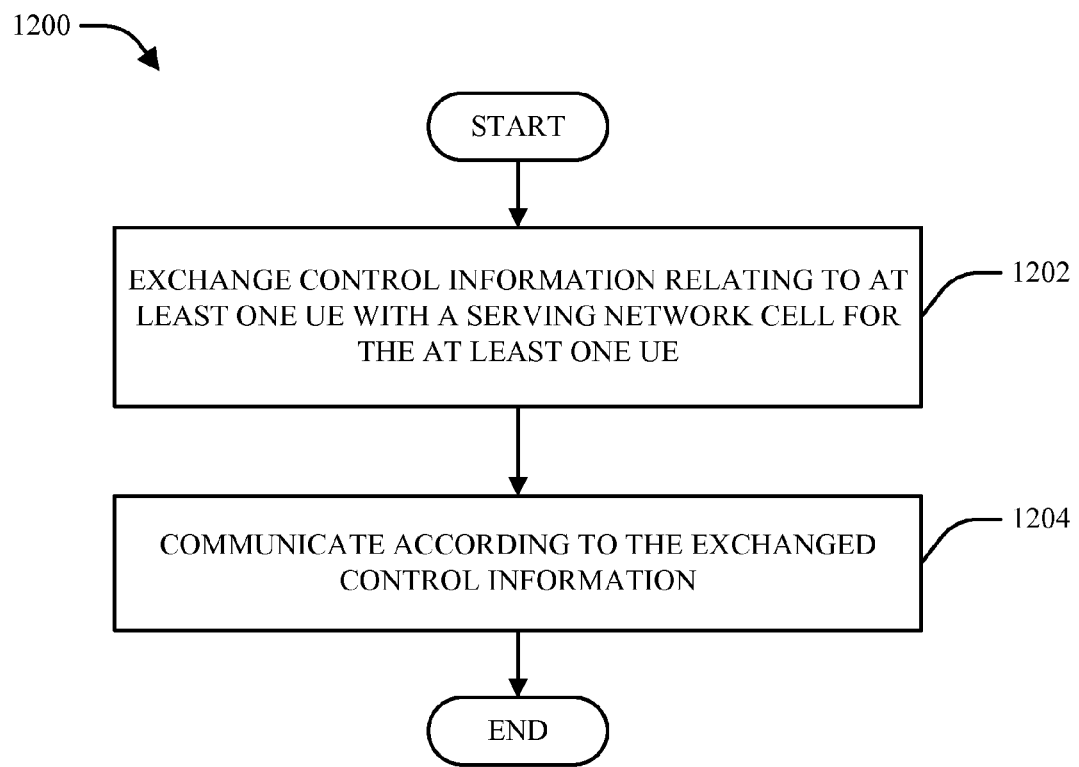
FIGS. 12-14 are flow diagrams of respective methodologies for coordinating communication with a terminal and a serving network cell for the terminal in a wireless communication environment.

FIG. 12 illustrates a methodology 1200 for coordinating communication with a terminal (e.g., UE 110) and a serving network cell for the terminal (e.g., serving cell 120) in a wireless communication environment. Methodology 1200 can be performed by, for example, a wireless network cell (e.g., auxiliary cell 130) and/or any other suitable network entity. Methodology 1200 begins at block 1202, wherein control information relating to at least one UE is exchanged with a serving network cell for the at least one UE. Methodology 1200 can then conclude at block 1204, wherein communication is conducted according to the control information exchanged at block 1202.

Figure 13:
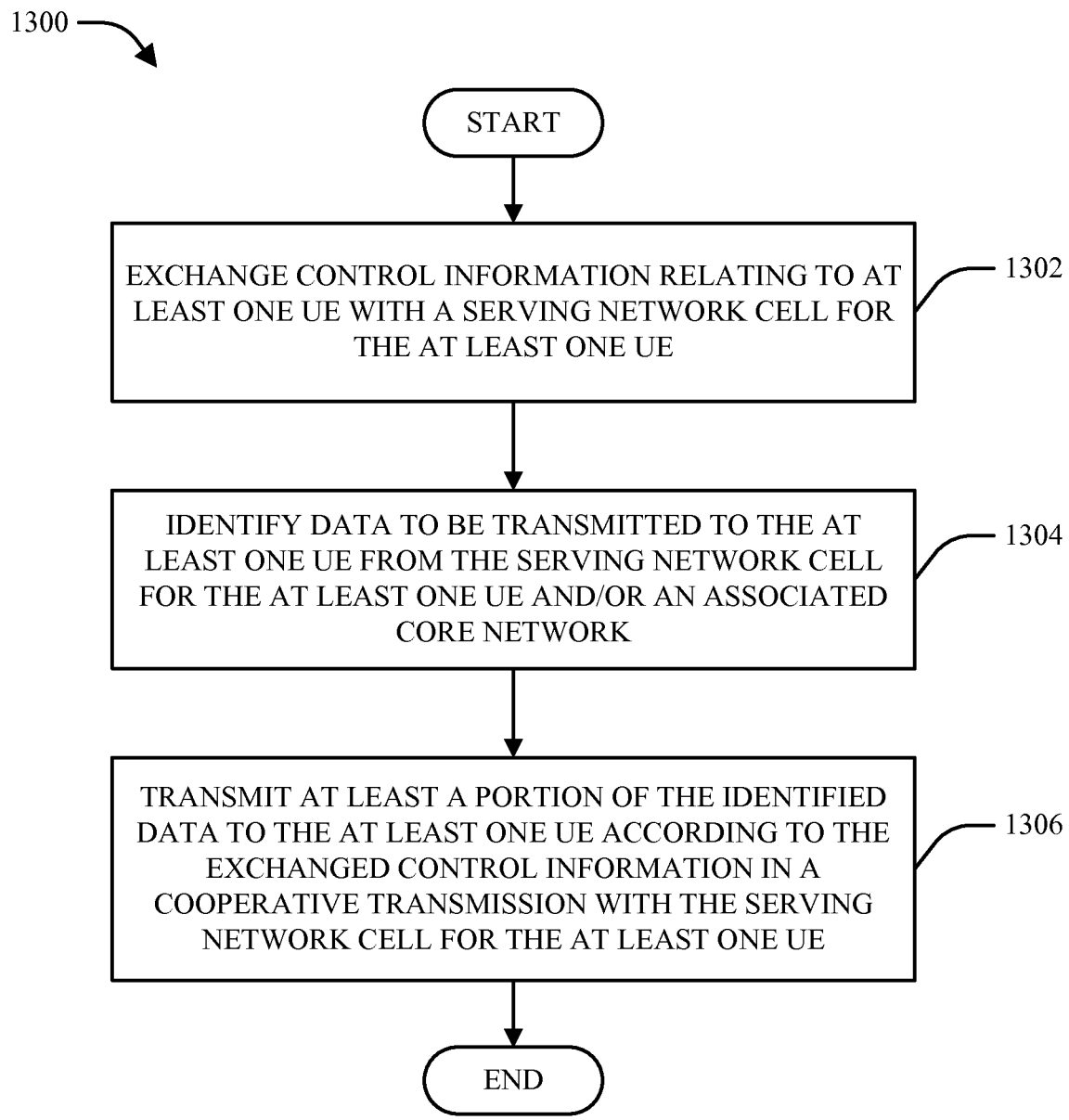

With reference to FIG. 13, illustrated is another methodology 1300 for coordinating communication with a terminal and a serving network cell for the terminal in a wireless communication environment. It is to be appreciated that methodology 1300 can be performed by, for example, an auxiliary network cell and/or any other appropriate network entity. Methodology 1300 begins at block 1302, wherein control information relating to at least one UE is exchanged with a serving network cell for the at least one UE. Next, at block 1304, data to be transmitted to the at least one UE are identified from the serving network cell for the at least one UE and/or an associated core network (e.g., core network 140). Methodology 1300 can then conclude at block 1306, wherein at least a portion of the identified data is transmitted to the at least one UE in a cooperative transmission with the serving network cell for the at least one UE according to the control information exchanged at block 1302.

Figure 14:
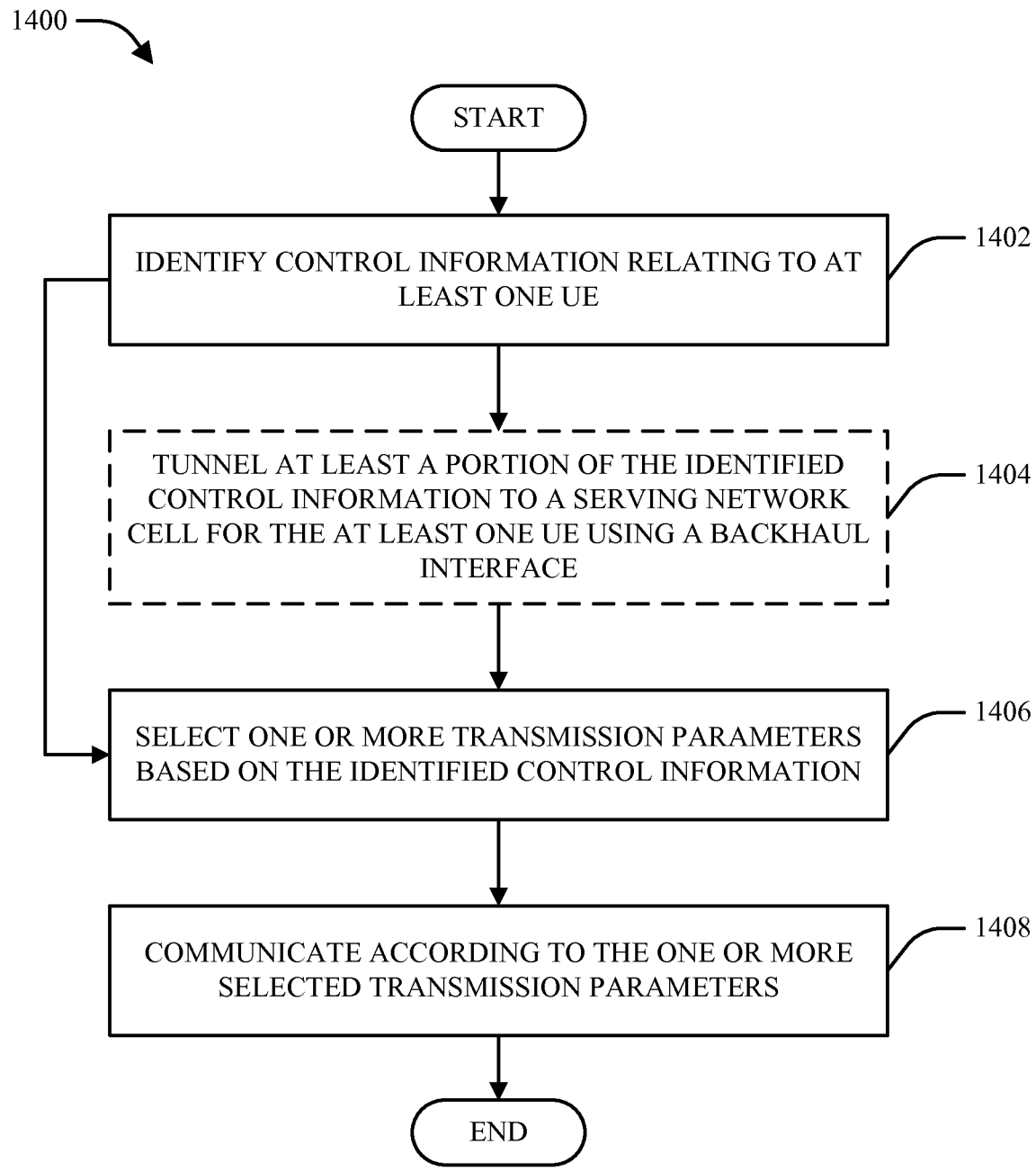

Turning to FIG. 14, an additional methodology 1400 for coordinating communication with a terminal and a serving network cell for the terminal in a wireless communication environment is illustrated. Methodology 1400 can be performed by, for example, a designated auxiliary network cell and/or any other appropriate network entity. Methodology 1400 begins at block 1402, wherein control information relating to at least one UE is identified. Methodology 1400 can then optionally proceed to block 1404, wherein at least a portion of the identified control information is tunneled to a serving network cell for the at least one UE using a backhaul interface. Upon completing the acts described at blocks 1402 and/or 1404, methodology 1400 can continue to block 1406, wherein one or more transmission parameters are selected based on the identified control information. Methodology 1400 can then conclude at block 1408, wherein communication is conducted according to the transmission parameter(s) selected at block 1406.

Referring next to FIGS. 15-19, respective apparatuses 1500-1900 that can be utilized to implement various aspects described herein are illustrated. It is to be appreciated that apparatuses 1500-1900 are represented as including functional blocks, which can be functional blocks that represent functions implemented by a processor, software, or combination thereof (e.g. firmware).

Figure 15:
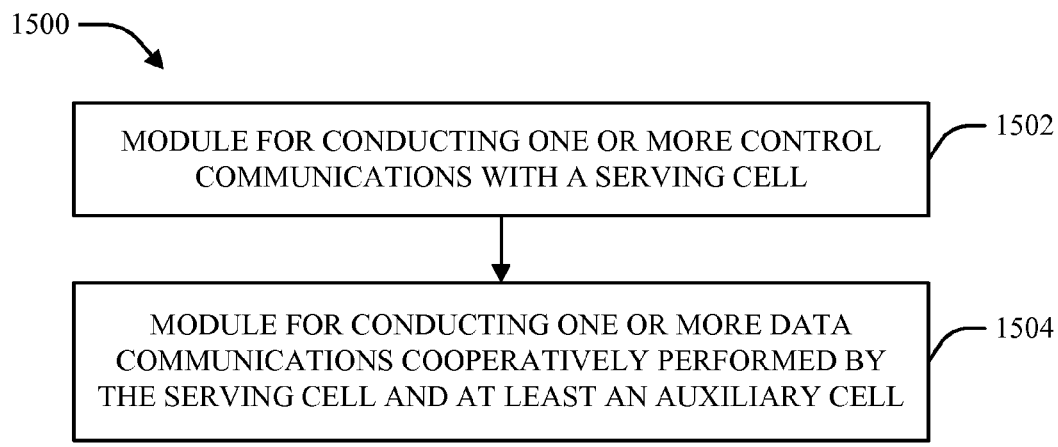
FIGS. 15-19 are block diagrams of respective apparatuses that facilitate cooperative communication in a wireless communication network.

Turning first to FIG. 15, illustrated is an apparatus 1500 that facilitates cooperative communication in a wireless communication network. Apparatus 1500 can be implemented by a UE (e.g., UE 110) and/or another suitable network entity and can include a module 1502 for conducting one or more control communications with a serving cell and a module 1504 for conducting one or more data communications cooperatively performed by the serving cell and at least an auxiliary cell.

Figure 16:
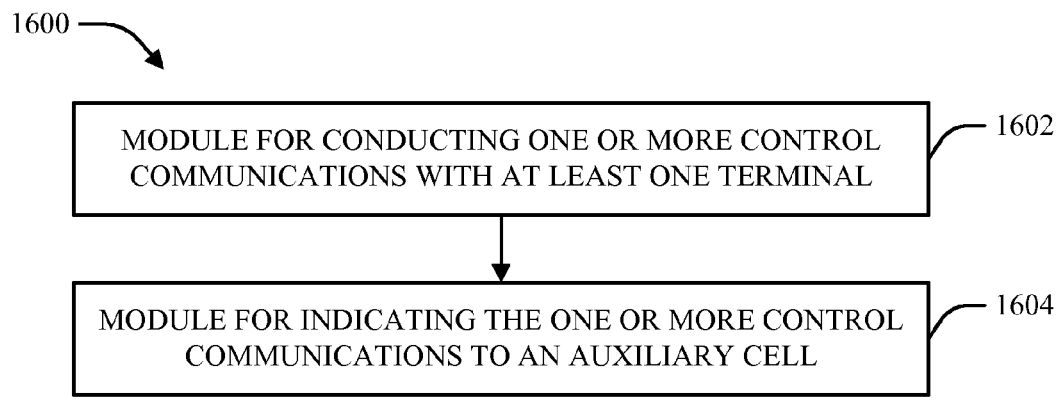

FIG. 16 illustrates another apparatus 1600 that facilitates cooperative communication in a wireless communication network. Apparatus 1600 can be implemented by a designated serving network cell (e.g. serving cell 120) and/or another suitable network entity and can include a module 1602 for conducting one or more control communications with at least one terminal and a module 1604 for indicating the one or more control communications to an auxiliary cell.

Figure 17:
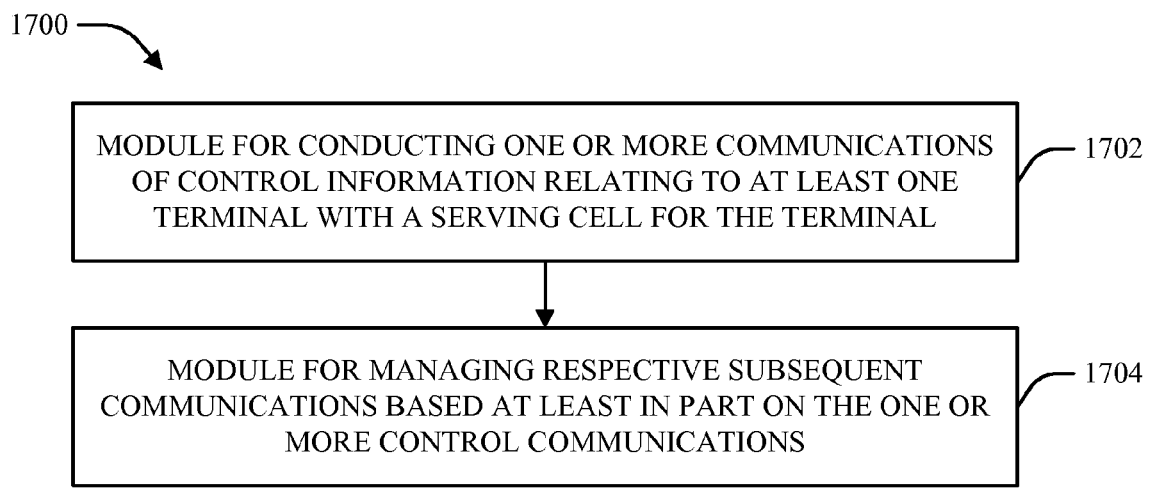

With reference to FIG. 17, illustrated is a third example apparatus 1700 that facilitates cooperative communication in a wireless communication network. Apparatus 1700 can be implemented by a designated auxiliary network cell (e.g. auxiliary cell 130) and/or another suitable network entity and can include a module 1702 for conducting one or more communications of control information relating to at least one terminal with a serving cell for the terminal and a module 1704 for managing respective subsequent communications based at least in part on the one or more control communications.

Figure 18:
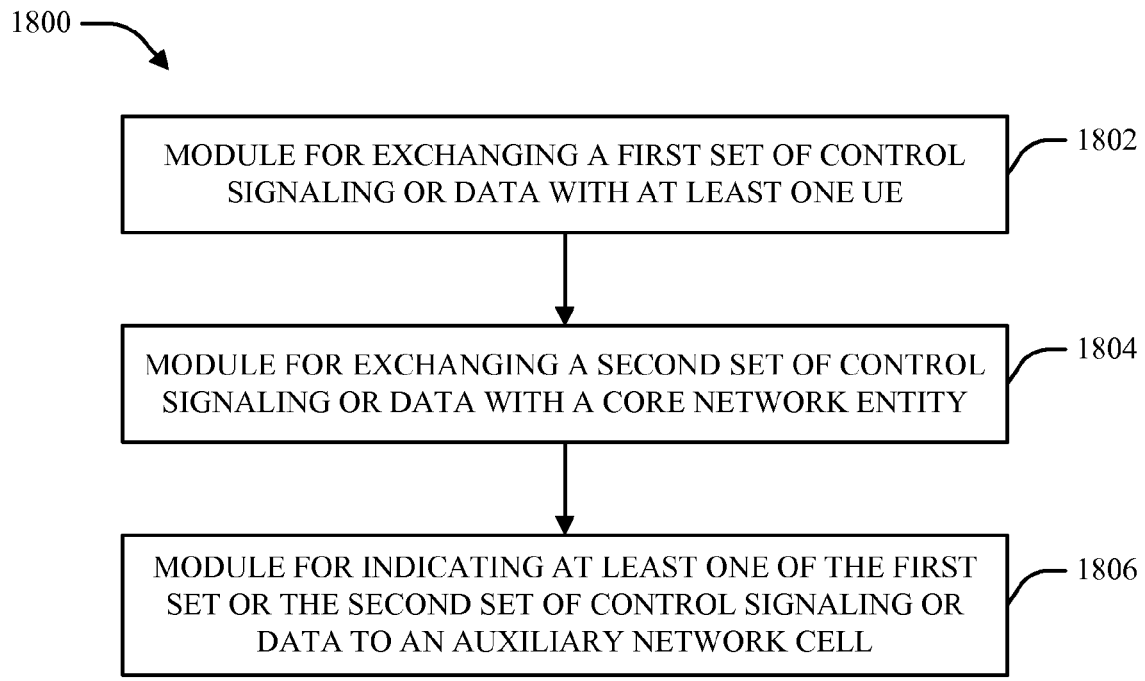

FIG. 18 illustrates a fourth example apparatus 1800 that facilitates cooperative communication in a wireless communication network. Apparatus 1800 can be implemented by a network cell configured as a serving network cell for one or more users (e.g., serving cell 120) and/or another suitable network entity and can include a module 1802 for exchanging a first set of control signaling or data with at least one UE (e.g., UE 110), a module 1804 for exchanging a second set of control signaling or data with a core network entity (e.g., core network 140), and a module 1806 for indicating at least one of the first set or the second set of control signaling or data to an auxiliary network cell (e.g., auxiliary cell 130).

Figure 19:
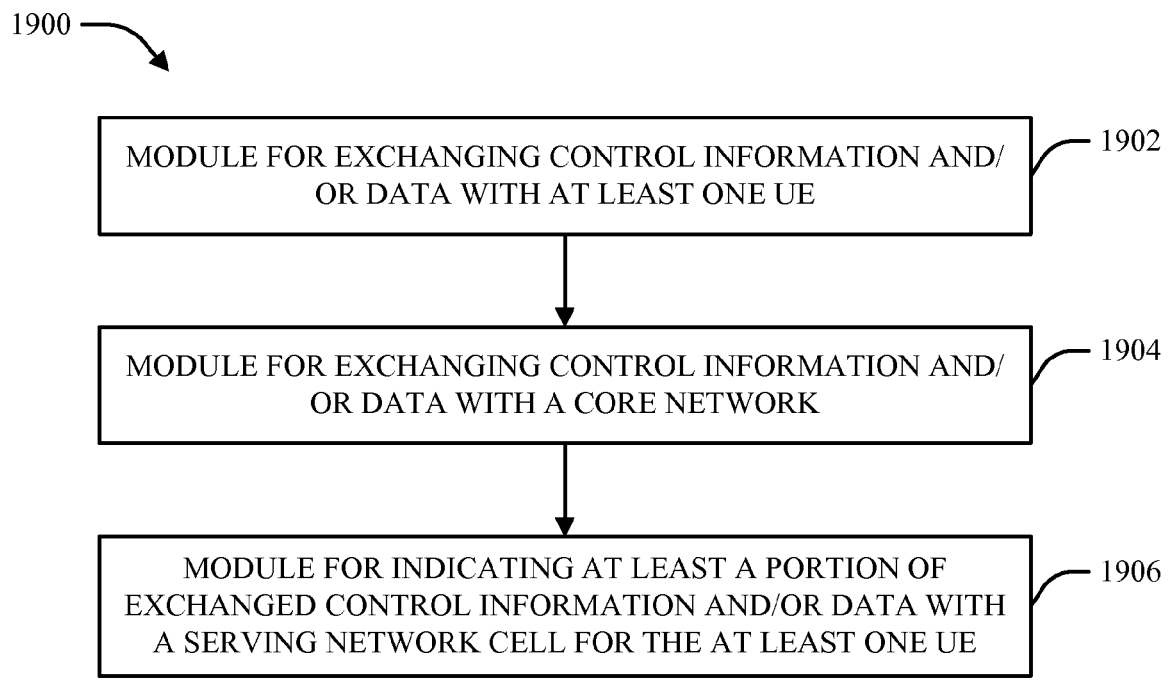

Referring next to FIG. 19, a fifth example apparatus 1900 that facilitates cooperative communication in a wireless communication network is illustrated. Apparatus 1900 can be implemented by a network cell configured as an auxiliary network cell (e.g., auxiliary cell 130) and/or another suitable network entity and can include a module 1902 for exchanging control information and/or data with at least one UE, a module 1904 for exchanging control information and/or data with a core network, and a module 1906 for indicating at least a portion of exchanged control information and/or data with a serving network cell for the at least one UE.

Figure 20:
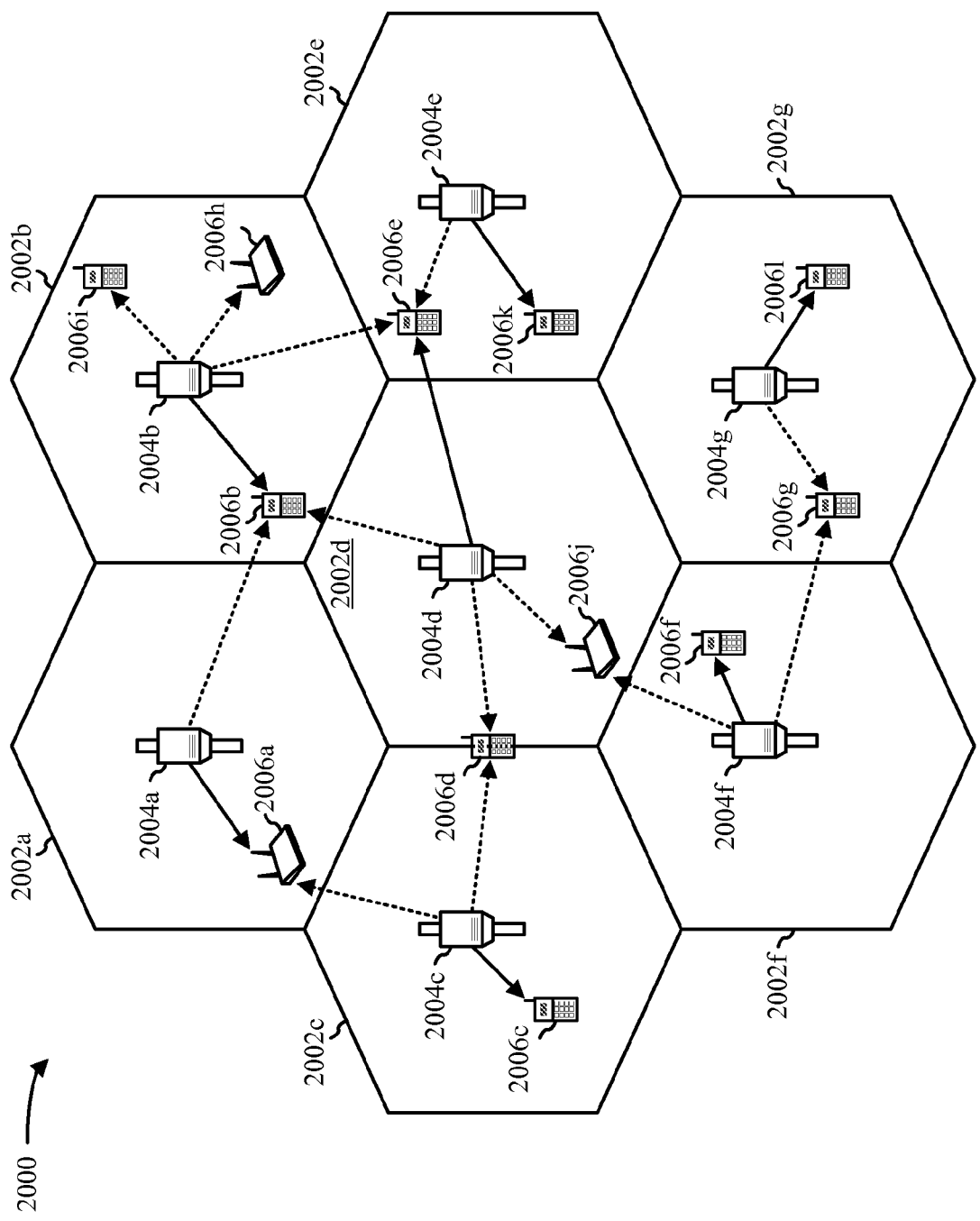
FIG. 20 illustrates an example cellular communication environment that can be utilized in accordance with various aspects set forth herein.

Turning to FIG. 20, an exemplary wireless communication system 2000 is illustrated. In one example, system 2000 can be configured to support a number of users, in which various disclosed embodiments and aspects can be implemented. As shown in FIG. 20, by way of example, system 2000 can provide communication for multiple cells 2002, (e.g., macro cells 2002a-2002g), with respective cells being serviced by corresponding access points (AP) 2004 (e.g., APs 2004a-2004g). In one example, one or more cells can be further divided into respective sectors (not shown). As used herein, APs can also be referred to as base stations, Node Bs, Evolved Node Bs (eNBs), or the like.

As FIG. 20 further illustrates, various access terminals (ATs) 2006, including ATs 2006a-2006k, can be dispersed throughout system 2000. As used herein, ATs can also be referred to as terminals, users, UEs, or the like. In one example, an AT 2006 can communicate with one or more APs 2004 on a forward link (FL) and/or a reverse link (RL) at a given moment, depending upon whether the AT is active and whether it is in soft handoff and/or another similar state. As used herein and generally in the art, an AT 2006 can also be referred to as a user equipment (UE), a mobile terminal, and/or any other suitable nomenclature. In accordance with one aspect, system 2000 can provide service over a substantially large geographic region. For example, macro cells 2002a-2002g can provide coverage for a plurality of blocks in a neighborhood and/or another similarly suitable coverage area.

Figure 21:
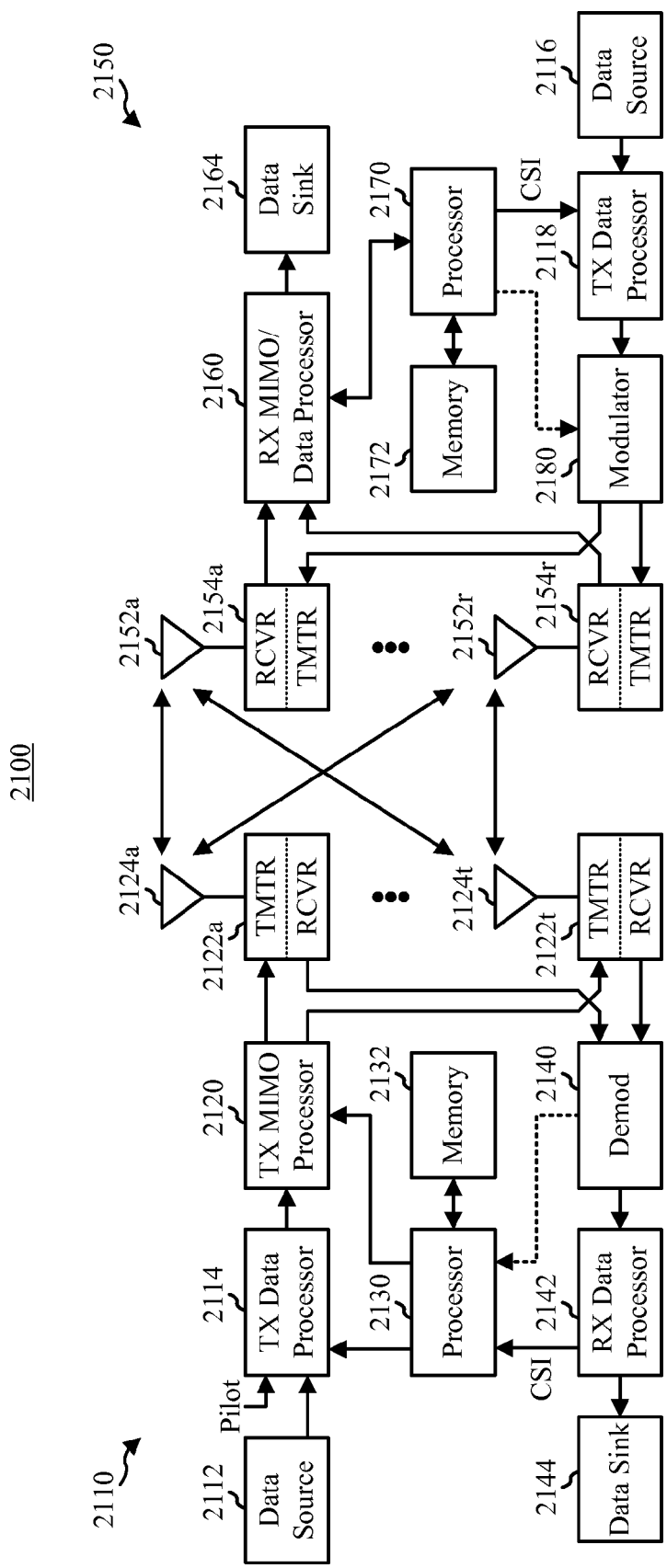
FIG. 21 is a block diagram illustrating an example wireless communication system in which various aspects described herein can function.

Referring now to FIG. 21, a block diagram illustrating an example wireless communication system 2100 in which various aspects described herein can function is provided. In one example, system 2100 is a multiple-input multiple-output (MIMO) system that includes a transmitter system 2110 and a receiver system 2150. It should be appreciated, however, that transmitter system 2110 and/or receiver system 2150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2110 and/or receiver system 2150 described herein could be utilized in connection with a single output to single input antenna system.

In accordance with one aspect, traffic data for a number of data streams are provided at transmitter system 2110 from a data source 2112 to a transmit (TX) data processor 2114. In one example, each data stream can then be transmitted via a respective transmit antenna 2124. Additionally, TX data processor 2114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2150 to estimate channel response. Back at transmitter system 2110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2130.

Next, modulation symbols for all data streams can be provided to a TX processor 2120, which can further process the modulation symbols (e.g., for OFDM). TX MIMO processor 2120 can then provides $N_T$ modulation symbol streams to $N_T$ transceivers 2122a through 2122t. In one example, each transceiver 2122 can receive and process a respective symbol stream to provide one or more analog signals. Each transceiver 2122 can then further condition (e.g., amplify, filter, and upconvert) the analog signals to provide a modulated signal suitable for transmission over a MIMO channel. Accordingly, $N_T$ modulated signals from transceivers 2122a through 2122t can then be transmitted from $N_T$ antennas 2124a through 2124t, respectively.

In accordance with another aspect, the transmitted modulated signals can be received at receiver system 2150 by $N_R$ antennas 2152a through 2152r. The received signal from each antenna 2152 can then be provided to respective transceivers 2154. In one example, each transceiver 2154 can condition (e.g., filter, amplify, and downconvert) a respective received signal, digitize the conditioned signal to provide samples, and then processes the samples to provide a corresponding "received" symbol stream. An RX MIMO/data processor 2160 can then receive and process the $N_R$ received symbol streams from $N_R$ transceivers 2154 based on a particular receiver processing technique to provide $N_T$ "detected" symbol streams. In one example, each detected symbol stream can include symbols that are estimates of the modulation symbols transmitted for the corresponding data stream. RX processor 2160 can then process each symbol stream at least in part by demodulating, deinterleaving, and decoding each detected symbol stream to recover traffic data for a corresponding data stream. Thus, the processing by RX processor 2160 can be complementary to that performed by TX MIMO processor 2120 and TX data processor 2116 at transmitter system 2110. RX processor 2160 can additionally provide processed symbol streams to a data sink 2164.

In accordance with one aspect, the channel response estimate generated by RX processor 2160 can be used to perform space/time processing at the receiver, adjust power levels, change modulation rates or schemes, and/or other appropriate actions. Additionally, RX processor 2160 can further estimate channel characteristics such as, for example, signal-to-noise-and-interference ratios (SNRs) of the detected symbol streams. RX processor 2160 can then provide estimated channel characteristics to a processor 2170. In one example, RX processor 2160 and/or processor 2170 can further derive an estimate of the "operating" SNR for the system. Processor 2170 can then provide channel state information (CSI), which can comprise information regarding the communication link and/or the received data stream. This information can include, for example, the operating SNR. The CSI can then be processed by a TX data processor 2118, modulated by a modulator 2180, conditioned by transceivers 2154a through 2154r, and transmitted back to transmitter system 2110. In addition, a data source 2116 at receiver system 2150 can provide additional data to be processed by TX data processor 2118.

Back at transmitter system 2110, the modulated signals from receiver system 2150 can then be received by antennas 2124, conditioned by transceivers 2122, demodulated by a demodulator 2140, and processed by a RX data processor 2142 to recover the CSI reported by receiver system 2150. In one example, the reported CSI can then be provided to processor 2130 and used to determine data rates as well as coding and modulation schemes to be used for one or more data streams. The determined coding and modulation schemes can then be provided to transceivers 2122 for quantization and/or use in later transmissions to receiver system 2150. Additionally and/or alternatively, the reported CSI can be used by processor 2130 to generate various controls for TX data processor 2114 and TX MIMO processor 2120. In another example, CSI and/or other information processed by RX data processor 2142 can be provided to a data sink 2144.

In one example, processor 2130 at transmitter system 2110 and processor 2170 at receiver system 2150 direct operation at their respective systems. Additionally, memory 2132 at transmitter system 2110 and memory 2172 at receiver system 2150 can provide storage for program codes and data used by processors 2130 and 2170, respectively. Further, at receiver system 2150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   transmitting, by a serving network cell, control information to at least a first user equipment unit (UE), the control information comprising assignment information for at least one transmission of first data routed from a core network, wherein the serving network cell and an auxiliary network cell comprise a Cooperative Multipoint (CoMP) set of cells cooperating for the at least one transmission of the first data to the first UE and second data to a second UE using one or more of joint processing or cooperative beamforming;
   indicating the control information to the auxiliary network cell over a backhaul interface between the serving network cell and the auxiliary network cell; and
   cooperatively conducting the at least one transmission with the auxiliary network cell in accordance with the control information, wherein the first data transmitted from the serving network cell for the at least one transmission is routed from the core network to the serving network cell for transmission to the first UE without being routed over the backhaul interface, and the first data transmitted from the auxiliary network cell for the at least one transmission is routed from the core network to the auxiliary network cell for transmission to the first UE without being routed over the backhaul interface.

2. The method of claim 1, wherein the assignment information comprises physical downlink control channel assignment information for the first UE associated with the at least one transmission.

3. The method of claim 1, wherein the indicating comprises indicating the control information to the auxiliary network cell over an X2 interface.

4. The method of claim 1, further comprising receiving second control information corresponding relating to the first UE from the auxiliary network cell via the backhaul interface.

5. The method of claim 4, wherein the backhaul interface is an X2 interface.

6. The method of claim 4, wherein the second control information comprises acknowledgement (ACK) information relating to the first UE, the method further comprising;
   generating a transmission schedule for the at least one of the first data or the control information based at least in part on the received ACK information; and
   transmitting designated information based on the transmission schedule, wherein the designated information comprises at least one of the first data or the control information.

7. The method of claim 1, wherein the first data is transmitted from the serving network cell utilizing a first coefficient, the first data is transmitted from the auxiliary network cell utilizing a second coefficient different than the first coefficient, and the first and second coefficients are selected to improve one or more of a signal-to-noise ratio or a capacity of the CoMP set of cells.

8. A wireless communications apparatus, comprising:
   a memory that stores data relating to at least one terminal and an auxiliary network cell; and
   a processor configured to:
      transmitting, by a serving network cell, control information to at least a first terminal, the control information comprising assignment information for at least one transmission of first data routed from a core network, wherein the serving network cell and an auxiliary network cell comprise a Cooperative Multipoint (CoMP) set of cells cooperating for the at least one transmission of the first data to the first terminal and second data to a second terminal using one or more of joint processing or cooperative beamforming;
      indicate the transmitted control information to the auxiliary network cell over a backhaul interface between the serving network cell and the auxiliary network cell; and
      cooperatively conducting the at least one transmission with the auxiliary network cell in accordance with the control information wherein the first data transmitted from the serving network cell for the at least one transmission is routed from the core network to the serving network cell for transmission to the first terminal without being routed over the backhaul interface, and the first data transmitted from the auxiliary network cell for the at least one transmission is routed from the core network to the auxiliary network cell for transmission to the first terminal without being routed over the backhaul interface.

9. The wireless communications apparatus of claim 8, wherein the assignment information transmitted to the first terminal comprises physical downlink control channel assignment information associated with the at least one transmission.

10. The wireless communications apparatus of claim 8, wherein the processor is further configured to indicate the transmitted control information to the auxiliary network cell over an X2 interface.

11. The wireless communications apparatus of claim 8, wherein the processor is further configured to receive second control information relating to the first terminal from the auxiliary network cell via the backhaul interface.

12. The wireless communications apparatus of claim 11, wherein the backhaul interface is an X2 interface.

13. An apparatus, comprising:
means for transmitting, by a serving network cell, one or more control communications to at least a first terminal, the control communications comprising assignment information for at least one transmission of first data routed from a core network, wherein the serving network cell and an auxiliary network cell comprise a Cooperative Multipoint (CoMP) set of cells cooperating for the at least one transmission of the first data to the first terminal and second data to a second terminal using one or more of joint processing or cooperative beamforming;
means for indicating the one or more control communications to the auxiliary network cell over a backhaul interface between the serving network cell and the auxiliary network cell; and
means for cooperatively conducting the at least one transmission with the auxiliary network cell in accordance with the assignment information wherein the first data transmitted from the serving network cell for the at least one transmission is routed from the core network to the serving network cell for transmission to the first terminal without being routed over the backhaul interface, and the first data transmitted from the auxiliary network cell for the at least one transmission is routed from the core network to the auxiliary network cell for transmission to the first terminal without being routed over the backhaul interface.

14. The apparatus of claim 13, wherein the means for transmitting one or more control communications comprises means for transmitting physical downlink control channel assignment information to the first terminal associated with the at least one transmission.

15. The apparatus of claim 13, wherein the backhaul interface is an X2 interface.

16. A computer program product, comprising:
a non-transitory computer-readable medium, comprising:
code for causing a computer to transmit, by a serving network cell, one or more control communications to at least a first user equipment unit (UE), the control communications comprising assignment information for at least one transmission of first data routed from a core network, wherein the serving network cell and an auxiliary network cell comprise a Cooperative Multipoint (CoMP) set of cells cooperating for the at least one transmission of the first data to the first UE and second data to a second UE using one or more of joint processing or cooperative beamforming;
code for causing a computer to indicate the one or more control communications to the auxiliary network cell over a backhaul interface between the serving network cell and the auxiliary network cell; and
code for causing a computer to cooperatively conduct the at least one transmission with the auxiliary network cell in accordance with the control communications, wherein the first data transmitted from the serving network cell for the at least one transmission is routed from the core network to the serving network cell for transmission to the first UE without being routed over the backhaul interface, and the first data transmitted from the auxiliary network cell for the at least one transmission is routed from the core network to the auxiliary network cell for transmission to the first UE without being routed over the backhaul interface.

17. The computer program product of claim 16, wherein the code for causing a computer to transmit one or more control communications comprises code for causing a computer to transmit physical downlink control channel assignment information to the first UE associated with the at least one transmission.

18. A method, comprising:
receiving, at an auxiliary network cell, control information relating to at least a first user equipment unit (UE) from a serving network cell over a backhaul interface between the serving network cell and the auxiliary network cell, the control information with comprising assignment information for at least one transmission of first data routed from a core network, wherein the serving network cell and the auxiliary network cell comprise a Cooperative Multipoint (CoMP) set of cells cooperating for transmission of the first data to the first UE and second data to a second UE using one or more of joint processing or cooperative beamforming;
receiving the first data at the auxiliary network cell for transmission to the first UE in the at least one transmission, the first data received at the auxiliary network cell from the core network without being routed over the backhaul interface; and
transmitting the first data from the auxiliary network cell to the first UE in the at least one transmission cooperatively conducted with the serving network cell according to the control information, wherein the first data transmitted from the serving network cell for the at least one transmission is routed from the core network to the serving network cell for transmission to the first UE without being routed over the backhaul interface.

19. The method of claim 18, wherein the receiving the control information comprises receiving physical downlink control channel assignment information associated with the at least one transmission.

20. The method of claim 19, further comprising:
exchanging control information distinct from the physical downlink control channel assignment information with the first UE according to the physical downlink control channel assignment information.

21. The method of claim 18, further comprising:
receiving second control information relating to the first UE; and
tunneling the received second control information to the serving network cell for the first UE via the backhaul interface to the serving network cell.

22. The method of claim 21, wherein the backhaul interface is an X2 interface.

23. The method of claim 18, further comprising:
receiving second control information relating to interference observed at the first UE;
selecting one or more transmission parameters such that the interference observed at the first UE is substantially minimized; and
communicating according to the one or more selected transmission parameters.

24. The method of claim 23, wherein the one or more transmission parameters comprise at least one of a transmit power parameter and a beam direction parameter.

25. The method of claim 18, wherein the first data is transmitted from the serving network cell utilizing a first coefficient, the first data is transmitted from the auxiliary network cell utilizing a second coefficient different than the first coefficient, and the first and second coefficients are selected to improve one or more of a signal-to-noise ratio or a capacity of the CoMP set of cells.

26. A wireless communications apparatus, comprising:
a memory that stores data relating to at least a first user equipment unit (UE) and a serving network cell for the first UE; and
a processor configured to:
receive, at an auxiliary network cell, control information relating to the first user equipment unit (UE) from the serving network cell over a backhaul interface between the serving network cell and the auxiliary network cell, the control information comprising assignment information for at least one transmission of first data routed from a core network, wherein the serving network cell and the auxiliary network cell comprise a Cooperative Multipoint (CoMP) set of cells cooperating for transmission of the first data to the first UE and second data to a second UE using one or more of joint processing or cooperative beamforming;
receive, at the auxiliary cell, the first data from the core network for transmission to the first UE in the at least one transmission, the first data received at the auxiliary network cell from the core network without being routed over the backhaul interface; and
transmit, in the at least one transmission cooperatively conducted with the serving network cell, the first data from the auxiliary network cell to the first UE according to the received control information wherein the first data transmitted from the serving network cell for the at least one transmission is routed from the core network to the serving network cell for transmission to the first UE without being routed over the backhaul interface.

27. The wireless communications apparatus of claim 26, wherein the backhaul interface is an X2 interface.

28. The wireless communications apparatus of claim 26, wherein the processor is further configured to exchange second control information relating to interference observed at the first UE with the serving network cell, to select one or more transmission parameters such that the interference observed at the first UE is substantially minimized, and to communicate according to the one or more selected transmission parameters.

29. An apparatus, comprising:
means for receiving, at an auxiliary network cell, one or more communications of control information relating to at least a first terminal from a serving network cell over a backhaul interface between the serving network cell and the auxiliary network cell the control information comprising assignment information for at least one transmission of first data routed from a core network, wherein the serving network cell and the auxiliary network cell comprise a Cooperative Multipoint (CoMP) set of cells cooperating for transmission of the first data to the first terminal and second data to a second terminal using one or more of joint processing or cooperative beamforming;

means for receiving the first data at the auxiliary network cell for transmission to the first terminal in the at least one transmission, the first data received at the auxiliary network cell without being routed over the backhaul interface; and
means for transmitting the first data from the auxiliary network cell to the first terminal in the at least one transmission cooperatively conducted with the serving network cell based at least in part on the one or more control communications, wherein the first data transmitted from the serving network cell for the at least one transmission is routed from the core network to the serving network cell for transmission to the first terminal without being routed over the backhaul interface.

30. The apparatus of claim 29, wherein the means for receiving the one or more communications of the control information comprises means for receiving one or more communications of physical downlink control channel assignment information associated with the at least one transmission.

31. The apparatus of claim 29, wherein:
the means for receiving the one or more communications of the control information further comprises:
means for exchanging second control information relating to interference observed at the first terminal;
means for selecting one or more transmission parameters such that the interference observed at the first terminal is substantially minimized; and
means for conducting the respective subsequent communications according to the one or more selected transmission parameters.

32. A computer program product, comprising:
a non-transitory computer-readable medium, comprising:
code for causing a computer to receive, at an auxiliary network cell, one or more communications of control information relating to at least a first user equipment unit (UE) from a serving network cell over a backhaul interface between the serving network cell and the auxiliary network cell, the control information comprising assignment information for at least one transmission of first data routed from a core network, wherein the serving network cell and the auxiliary network cell comprise a Cooperative Multipoint (CoMP) set of cells cooperating for transmission of the first data to the first UE and second data to a second UE using one or more of joint processing or cooperative beamforming;
code for causing a computer to receive the first data at the auxiliary network cell for transmission to the first UE in the at least one transmission, the first data received at the auxiliary network cell from the core network without being routed over the backhaul interface; and
code for causing a computer to transmit the first data from the auxiliary network cell to the first UE in the at least one transmission cooperatively conducted with the serving network cell wherein the first data transmitted from the serving network cell for the at least one transmission is routed from the core network to the serving network cell for transmission to the first UE without being routed over the backhaul interface.

33. The computer program product of claim 32, wherein the code for causing a computer to receive the one or more communications of the control information comprises code for causing a computer to receive one or more communications of physical downlink control channel assignment information associated with the at least one transmission.

34. The computer program product of claim 32, wherein:
the code for causing a computer to receive one or more communications of control information further comprises:
  code for causing a computer to exchange control information relating to interference observed at the first UE;
  code for causing a computer to select one or more transmission parameters such that the interference observed at the first UE is substantially minimized; and
  code for causing a computer to conduct the respective subsequent communications according to the one or more selected transmission parameters.

* * * * *